US012659417B2

(12) United States Patent
Yano et al.

(10) Patent No.: US 12,659,417 B2
(45) Date of Patent: Jun. 16, 2026

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventors: Yukari Yano, Kanagawa (JP); Akiko Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/614,241

(22) Filed: Mar. 22, 2024

(65) Prior Publication Data

US 2024/0323306 A1 Sep. 26, 2024

(30) Foreign Application Priority Data

Mar. 24, 2023 (JP) ................................ 2023-047678
Nov. 22, 2023 (JP) ................................ 2023-198089

(51) Int. Cl.
*H04N 1/44* (2006.01)
*H04N 1/00* (2006.01)

(52) U.S. Cl.
CPC ....... *H04N 1/4446* (2013.01); *H04N 1/00376* (2013.01); *H04N 1/0044* (2013.01); *H04N 2201/0094* (2013.01)

(58) Field of Classification Search
CPC ............... H04N 1/4446; H04N 1/0044; H04N 1/00376; H04N 2201/0094
USPC ........................................................ 358/3.24
See application file for complete search history.

(56) References Cited

U.S. PATENT DOCUMENTS

| | | | | |
|---|---|---|---|---|
| 2017/0124347 | A1* | 5/2017 | Kamata | G16H 10/60 |
| 2020/0007703 | A1* | 1/2020 | Kusano | H04N 1/0097 |
| 2020/0336610 | A1* | 10/2020 | Mochizuki | G06F 16/166 |
| 2021/0303895 | A1* | 9/2021 | Soga | G06V 10/96 |

FOREIGN PATENT DOCUMENTS

| | | | |
|---|---|---|---|
| JP | 2022073172 | A | 5/2022 |

* cited by examiner

*Primary Examiner* — Allen H Nguyen
(74) *Attorney, Agent, or Firm* — Canon U.S.A., Inc. IP Division

(57) ABSTRACT

An image processing apparatus for performing masking on text-containing data includes a memory storing a program and a processor which executes the program to perform a process. The process includes receiving a selection of attributes for text strings as masking targets and displaying text strings which are identified through analysis and which correspond to the selected attributes and also displaying a preview with the text strings masked. The preview is displayed in a first area, and the text strings are displayed in a second area with information indicating the text strings are selected as masking targets. In response to receiving in the second area a user operation for deselecting one text string as a masking target, the preview in the first area displays the one text string unmasked.

11 Claims, 19 Drawing Sheets

110

MFP

210

CONTROL UNIT

| 211 | 215 | 220 |
|-----|-----|-----|
| CPU | OPERATING UNIT I/F | OPERATING UNIT |

| 212 | 216 | 221 |
|-----|-----|-----|
| ROM | PRINTER I/F | PRINTER |

| 213 | 217 | 222 |
|-----|-----|-----|
| RAM | SCANNER I/F | SCANNER |

| 214 | 218 | 223 |
|-----|-----|-----|
| HDD | MODEM I/F | MODEM |

PSTN

219

NETWORK I/F

LAN

INTERNET

700

Select the method to designate a mask.

701                    702

Preset                 Manual

800

Select the preset mask you wish to use.

Health insurance card

Driver's license card

Drawing

Research report

~ 801

Back ~ 802

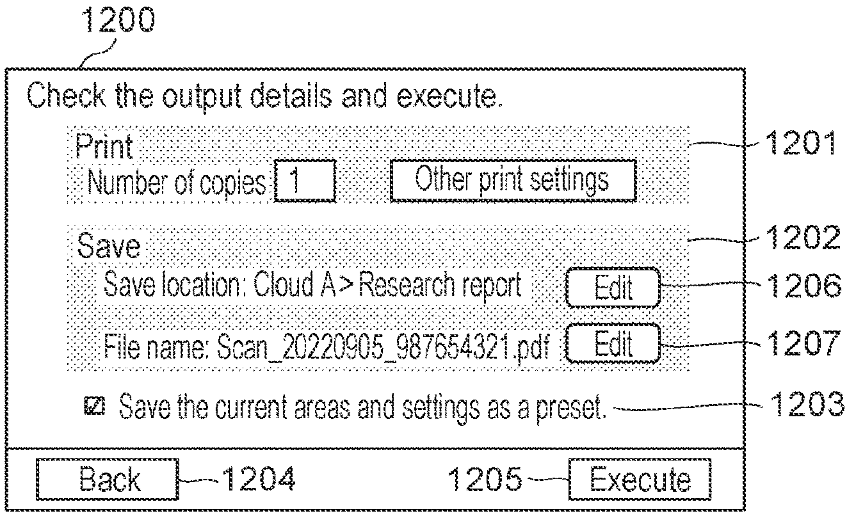

Check the output details and execute.

Print
Number of copies [1]     [Other print settings]          —1201

Save                                                      —1202
Save location: Cloud A > Research report   [Edit]        —1206
File name: Scan_20220905_987654321.pdf   [Edit]          —1207

☑ Save the current areas and settings as a preset.        —1203

[Back]  —1204        1205—  [Execute]

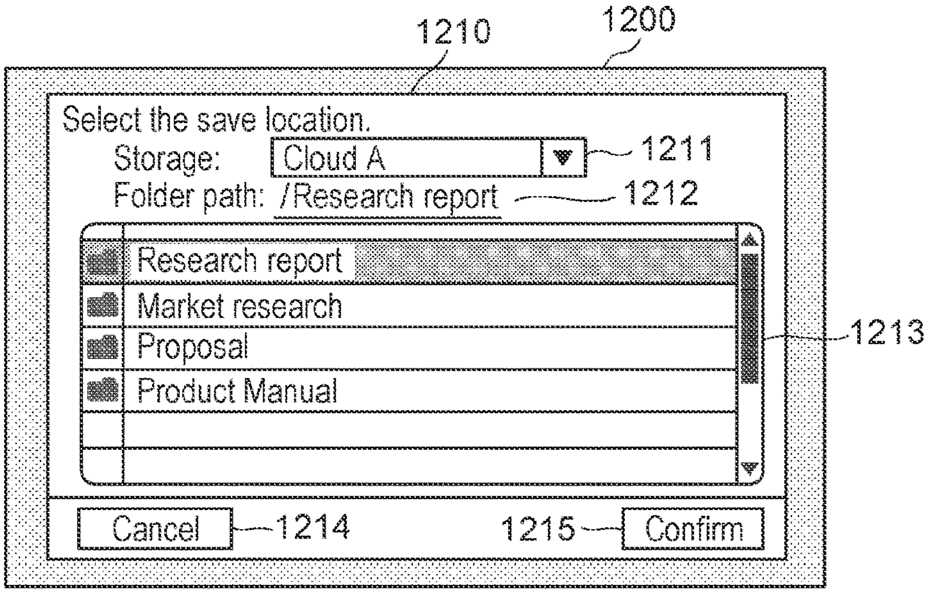

FIG. 12B 1210     1200

Select the save location.
Storage:      [Cloud A ▼]          —1211
Folder path: /Research report      —1212

Research report
Market research
Proposal                              —1213
Product Manual

[Cancel] —1214      1215— [Confirm]

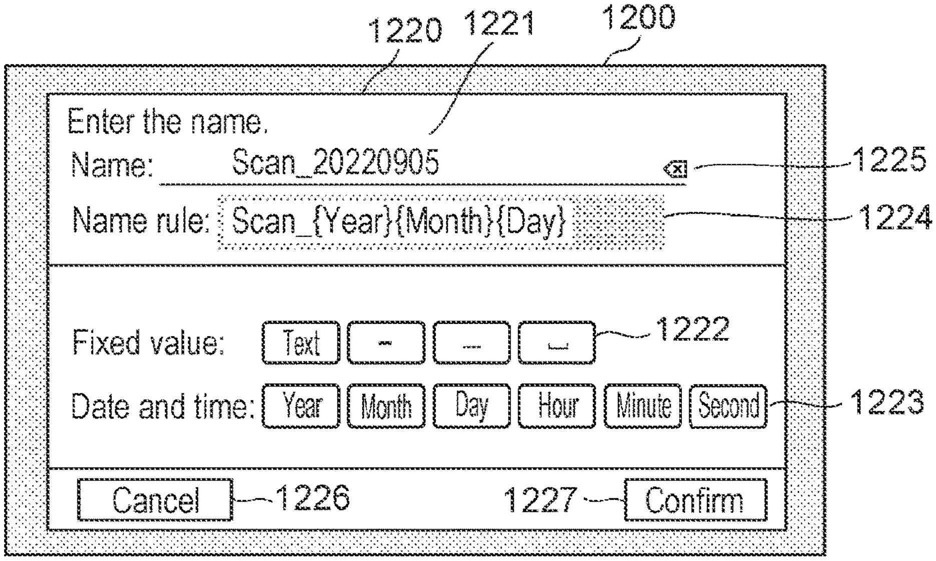

FIG. 12C 1220  1221   1200

Enter the name.
Name:      Scan_20220905              ⌫        —1225
Name rule: Scan_{Year}{Month}{Day}            —1224

Fixed value:  [Text] [—] [—] [—]              —1222

Date and time: [Year][Month][Day][Hour][Minute][Second]  —1223

[Cancel] —1226      1227— [Confirm]

| ID (1301) | TYPE (1302) | START POINT (1303) | END POINT (1304) | COLOR (1305) | TEXT STRING (1306) |
|---|---|---|---|---|---|
| MSK1 | ATTRIBUTE | (341,461) | (997,545) | #000000 | xxx-xxxx-xxxx |
| MSK2 | ATTRIBUTE | (441,557) | (1369,653) | #000000 | xxx@example.com |
| MSK3 | ATTRIBUTE | (1853, 41) | (2373, 133) | #000000 | 2022/12/22 |
| MSK4 | ATTRIBUTE | (1155, 1345) | (1341, 1419) | #000000 | XXX |
| MSK5 | ATTRIBUTE | (1577, 1347) | (1757, 1413) | #000000 | AAA |
| MSK6 | ATTRIBUTE | (1159, 1455) | (1315, 1521) | #000000 | YYY |
| MSK7 | ATTRIBUTE | (1641, 1455) | (1821, 1519) | #000000 | BBB |
| MSK8 | ATTRIBUTE | (707, 1555) | (877, 1629) | #000000 | YYY |
| MSK9 | ATTRIBUTE | (1921, 1559) | (2089, 1621) | #000000 | BBB |
| MSK10 | ATTRIBUTE | (875, 1669) | (1053, 1727) | #000000 | AAA |

| ID (1301) | TYPE (1302) | START POINT (1303) | END POINT (1304) | COLOR (1305) | TEXT STRING (1306) |
|---|---|---|---|---|---|
| MSK1 | ATTRIBUTE | (341, 461) | (997, 545) | #000000 | xxx-xxxx-xxxx |
| MSK2 | ATTRIBUTE | (441, 557) | (1369, 653) | #000000 | xxx@example.com |
| MSK3 | ATTRIBUTE | (1159, 1455) | (1315, 1521) | #000000 | YYY |
| MSK4 | ATTRIBUTE | (1641, 1455) | (1821, 1519) | #000000 | BBB |
| MSK5 | ATTRIBUTE | (707, 1555) | (877, 1629) | #000000 | YYY |
| MSK6 | ATTRIBUTE | (1921, 1559) | (2089, 1621) | #000000 | BBB |
| MSK7 | ATTRIBUTE | (479, 357) | (756, 439) | #000000 | *** |

| BUTTON ID (1401) | NAME (1402) | OUTPUT METHOD (1403) | SCAN SETTING (1404) | AREA INFORMATION (1405) | | | | | SAVE SETTING (1406) | | PRINT SETTING (1407) |
|---|---|---|---|---|---|---|---|---|---|---|---|
| | | | | ID (1411) | TYPE (1412) | COLOR (1413) | ATTRIBUTE NAME (1414) | ATTRIBUTE LOCK (1415) | SAVE LOCATION | FILE NAME | |
| BTN001 | RESEARCH REPORT | PRINT AND SAVE, PDF | AUTO SIZE, AUTO COLOR, SINGLE SIDED, 300 dpi, TEXT/PICTURE, NO MIXING | ATTR1 | ATTRIBUTE | #000000 | PERSONAL NAME | YES | Cloud A > Research report | Scan_{Year}{Month}{Day} | ONE COPY, BLACK AND WHITE, SINGLE SIDED, 1 on 1 |
| | | | | ATTR2 | ATTRIBUTE | #000000 | EMAIL ADDRESS | YES | | | |
| | | | | ATTR3 | ATTRIBUTE | #000000 | PHONE NUMBER | YES | | | |
| | | | | ATTR4 | ATTRIBUTE | #000000 | COMPANY NAME | NO | | | |
| | | | | ATTR5 | ATTRIBUTE | #000000 | PRODUCT NAME | NO | | | |

1500

Enter the preset name.

| Research report | 1501 |

Select attributes you wish to lock. (Optional)

| Title | Date | Phone number | 1502 |
| Email address | Division name | Personal name | |
| Company name | Product name | | |

| Back | 1503 | Confirm | 1504 |

FIG. 16

| # | OCR text string | Attribute name |
|---|---|---|
| 1 | 2022/11/14 | Date |
| 2 | *** | Personal name |
| 3 | Research report | Title |
| 4 | xxx@example.com | Email address |
| 5 | xxx-xxxx-xxxx | Phone number |
| 6 | XXX | Company name |
| 7 | YYY | Company name |
| 8 | AAA | Product name |
| 9 | BBB | Product name |

FIG. 18

| # | OCR TEXT STRING | ATTRIBUTE NAME | ITEM NAME |
|---|---|---|---|
| 1 | 2022/12/22 | DATE | COMPLETION DATE |
| 2 | *** | PERSONAL NAME | PERSON IN CHARGE |
| 3 | RESEARCH REPORT | TITLE | |
| 4 | xxx@example.com | EMAIL ADDRESS | EMAIL |
| 5 | xxx-xxxx-xxxx | PHONE NUMBER | TEL |
| 6 | XXX | COMPANY NAME | |
| 7 | YYY | COMPANY NAME | |
| 8 | AAA | PRODUCT NAME | |
| 9 | BBB | PRODUCT NAME | |

INFORMATION PROCESSING APPARATUS, CONTROL METHOD FOR INFORMATION PROCESSING APPARATUS, AND STORAGE MEDIUM

BACKGROUND

Field of the Disclosure

The present disclosure relates to technologies for masking scanned images.

Description of the Related Art

When sharing documents containing personal information or confidential information with others, such as identification documents, applications, and drawings, some parts of the documents may be masked by filling (also called 'black filling' or 'masking'). Japanese Patent Laid-Open No. 2022-73172 discloses a technology for masking confidential information corresponding to pre-registered attributes such as 'name,' 'date of birth,' and 'address'.

When masking the confidential information corresponding to attributes as in Japanese Patent Laid-Open No. 2022-73172, masking is automatically performed on the text strings identified through analysis.

SUMMARY

The present disclosure provides display technologies that allow users to visually check identified text strings corresponding to specific attributes and selectively exclude specific text strings from masking targets when necessary.

An image processing apparatus according to the present disclosure has a function of performing masking on data which contains text. The image processing apparatus includes at least one memory which stores a computer program and at least one processor which executes the computer program to perform a process. The process includes receiving a selection of one or more attributes for text strings serving as masking targets for the masking and displaying one or more text strings which are identified through analysis on the data and which correspond to the selected one or more attributes and also displaying a preview of the data in which the masking is performed on the one or more text strings contained in the data. The preview is displayed in a first area, and the one or more text strings are displayed in a second area different from the first area together with information indicating that each of the one or more text strings is selected as a masking target. In response to receiving in the second area a user operation for deselecting one text string among the one or more text strings from a masking target, in the first area, the preview is updated to another preview in which the masking on the one text string is released.

Further features of the present disclosure will become apparent from the following description of exemplary embodiments with reference to the attached drawings.

BRIEF DESCRIPTION OF THE DRAWINGS

FIGS. 12A, 12B, and 12C illustrate examples of an execution confirmation screen displayed by the MFP.

FIGS. 13A and 13B provide examples of area information stored by the MFP.

FIG. 14 provides an example of preset information stored by the MFP.

FIG. 16 provides an example of OCR text strings classified under attributes, stored by the MFP.

FIG. 18 provides an example of attributes, OCR text strings, and item names stored by the MFP.

DESCRIPTION OF THE EMBODIMENTS

Hereinafter, embodiments of the present disclosure will be described with reference to the drawings. The embodiments described herein are not intended to limit the disclosure as defined by the claims. Furthermore, not all combinations of features described in the embodiments are essential to the solution of the disclosure.

First Embodiment

Overall Configuration

Figure 1:
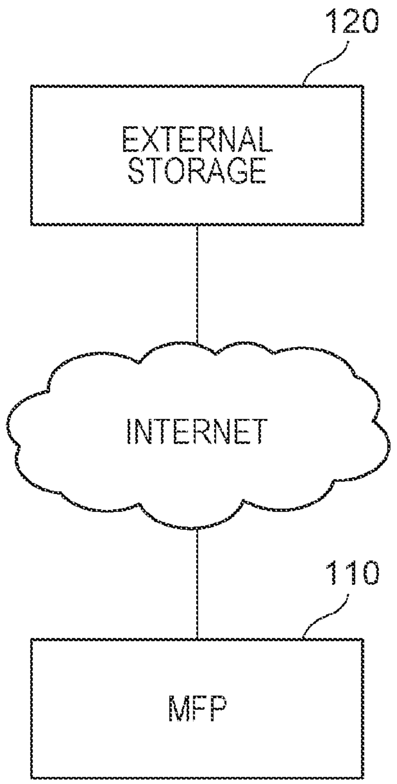
FIG. 1 illustrates an overall configuration of this system.

FIG. 1 illustrates an overall configuration of this system. An image processing system illustrated in FIG. 1 includes a multifunction peripheral (MFP) 110 and an external storage 120. The MFP 110 is communicatively connected via a local area network (LAN) to servers providing various services on the Internet.

The MFP 110 is a multifunctional machine having multiple functions such as a scanner and a printer. The MFP 110 is an example of an information processing apparatus according to the present disclosure. The MFP 110 also has a function of transferring scanned image files to services capable of storing files, such as external storage services. The information processing apparatus of the present disclosure is not limited to a multifunctional machine including a scanner and a printer, but may be a personal computer (PC). The information processing apparatus of the present disclosure may be a server that performs the operation of an attribute classification unit 428, which will be described later, and provides a screen displayed based on the data obtained by the operation for the communicatively connected MFP 110 or other devices.

The external storage (service) 120 is a service that stores files received through the Internet or obtains files from external devices via web browsers. The external storage 120 corresponds to, for example, a cloud service. Not only the external storage 120, but other external storages are also involved.

The image processing system according to the present embodiment consists of the MFP 110 and the external storage 120. However, this is not to be interpreted as limiting. For example, some of the functions and operations of the MFP 110 may be performed on a separate server provided on the Internet or a LAN. The external storage 120 may be provided on a LAN in place of on the Internet. The external storage 120 may be replaced with, for example, a mail server, and scanned images can be attached to an email and sent. The MFP 110 may also have the storage function of the external storage 120.

Hardware Configuration of MFP

Figure 2:
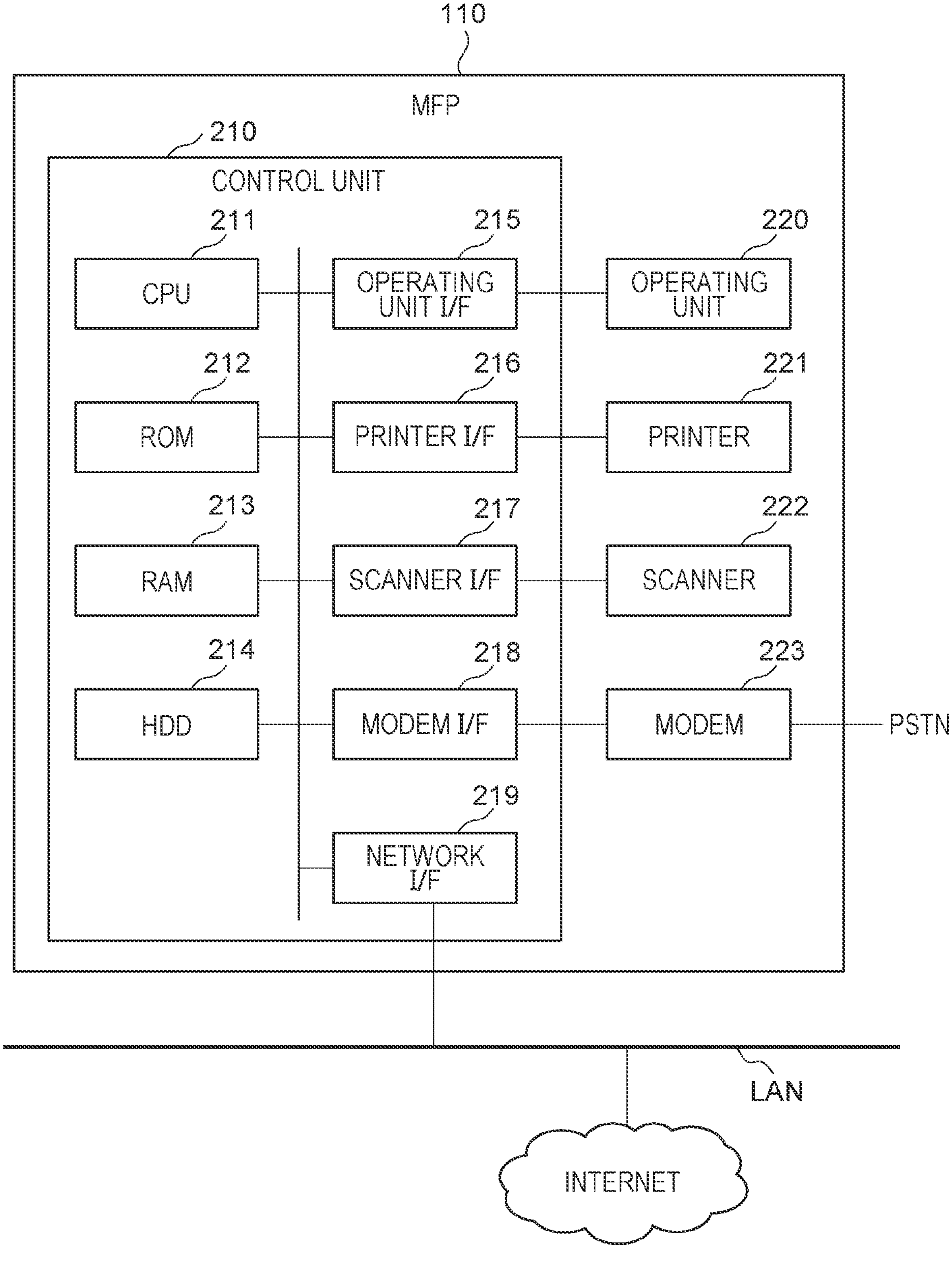
FIG. 2 illustrates a hardware configuration of a multifunction peripheral (MFP).

FIG. 2 illustrates a hardware configuration of the MFP 110. The MFP 110 includes a control unit 210, an operating unit 220, a printer unit 221, a scanner unit 222, and a modem 223. The control unit 210 includes the following units 211 to 219 and is operable to control the operations of the entire MFP 110. A central processing unit (CPU) 211 is operable to read control programs stored in a read-only memory (ROM) 212 and a hard disk drive (HDD) 214 and execute and control various functions of the MFP 110, such as reading/printing/communication. A random-access memory (RAM) 213 can be used as a temporary storage area that serves as, for example, the main memory and work area of the CPU 211. In the present embodiment, one CPU 211 can use one memory (the RAM 213 or the HDD 214) to perform the operations illustrated in the flowcharts described later. However, this is not to be interpreted as limiting. For example, multiple CPUs and multiple RAMs or HDDs may cooperate to perform the operations. The HDD 214 is a high-capacity storage unit for storing image data and various programs.

An operating unit I/F 215 is an interface that connects the operating unit 220 to the control unit 210. The operating unit 220 includes, for example, a touch panel and a keyboard. The operating unit 220 is operable to receive user's operations/inputs/instructions. A printer I/F 216 is an interface that connects the printer unit 221 to the control unit 210. Image data for printing can be transferred from the control unit 210 to the printer unit 221 via the printer I/F 216 and printed on a recording medium. A scanner I/F 217 is an interface that connects the scanner unit 222 to the control unit 210.

The scanner unit 222 is operable to read an original document that is set on an unillustrated document table or auto document feeder (ADF), generate image data, and input the image data to the control unit 210 via the scanner I/F 217. The MFP 110 is able to print out (copy) image data generated by the scanner unit 222 from the printer unit 221, as well as send files or emails. A modem I/F 218 is an interface that connects the modem 223 to the control unit 210. The modem 223 is operable to perform facsimile communication, transferring image data to facsimile machines in the public switched telephone network (PSTN). A network I/F 219 is an interface that connects the control unit 210 (the MFP 110) to a LAN. The MFP 110 uses the network I/F 219 to transmit image data and information to various services in the Internet and to receive various kinds of information.

Hardware Configuration of External Storage

Figure 3:
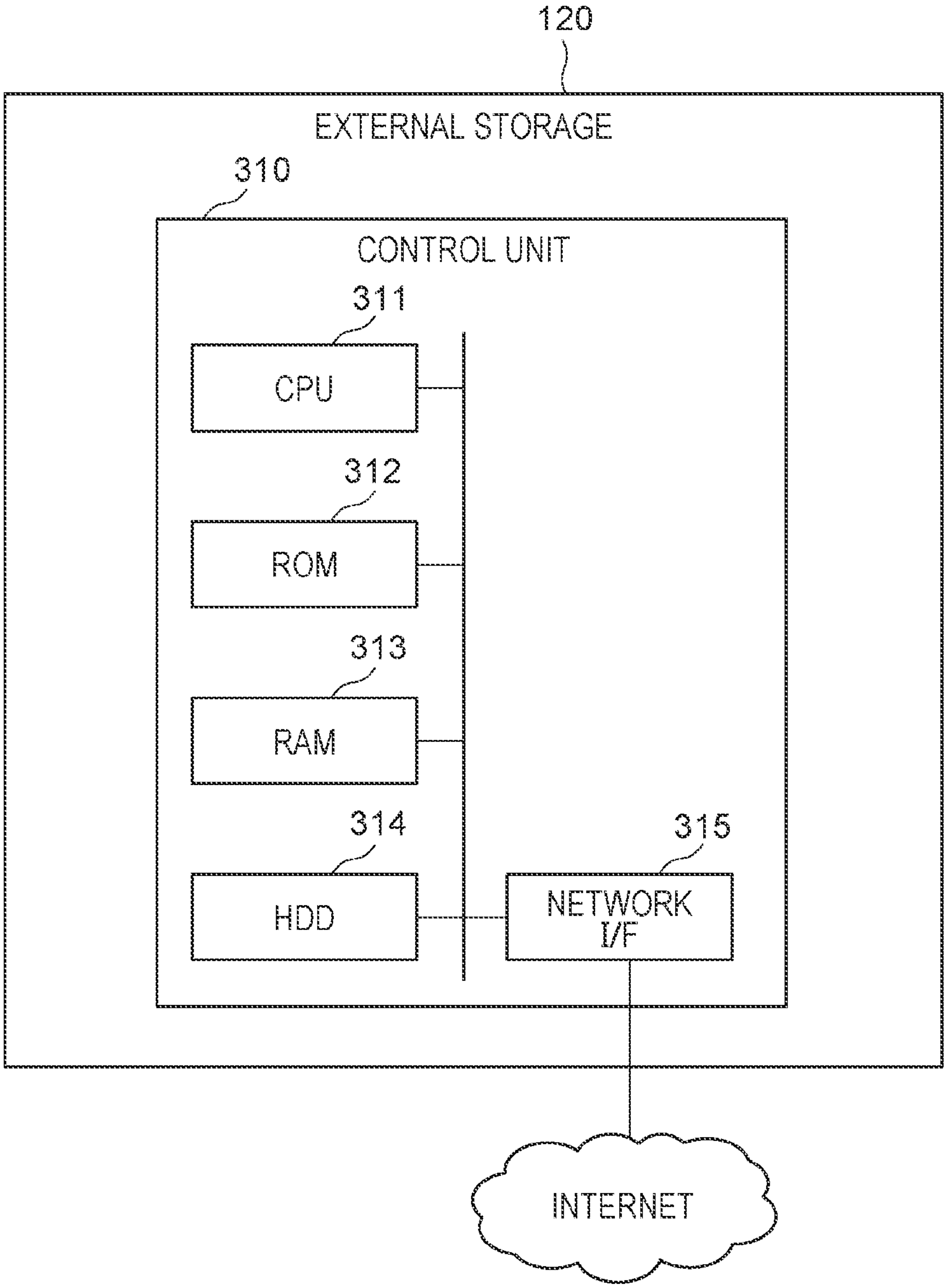
FIG. 3 illustrates a hardware configuration of an external storage.

FIG. 3 illustrates a hardware configuration of the external storage 120. The external storage 120 includes a CPU 311, a ROM 312, a RAM 313, an HDD 314, and a network I/F 315. The CPU 311 is operable to control the overall operation by reading the control programs stored in the ROM 312 and performing various operations. The RAM 313 can be used as a temporary storage area that serves as, for example, the main memory and work area of the CPU 311. The HDD 314 is a high-capacity storage unit for storing image data and various programs. The network I/F 315 is an interface that connects the external storage 120 to the Internet. The external storage 120 receives processing requests from other devices (such as the MFP 110) via the network I/F 315 and transmits and receives various kinds of information.

Software Configuration of MFP

Figure 4:
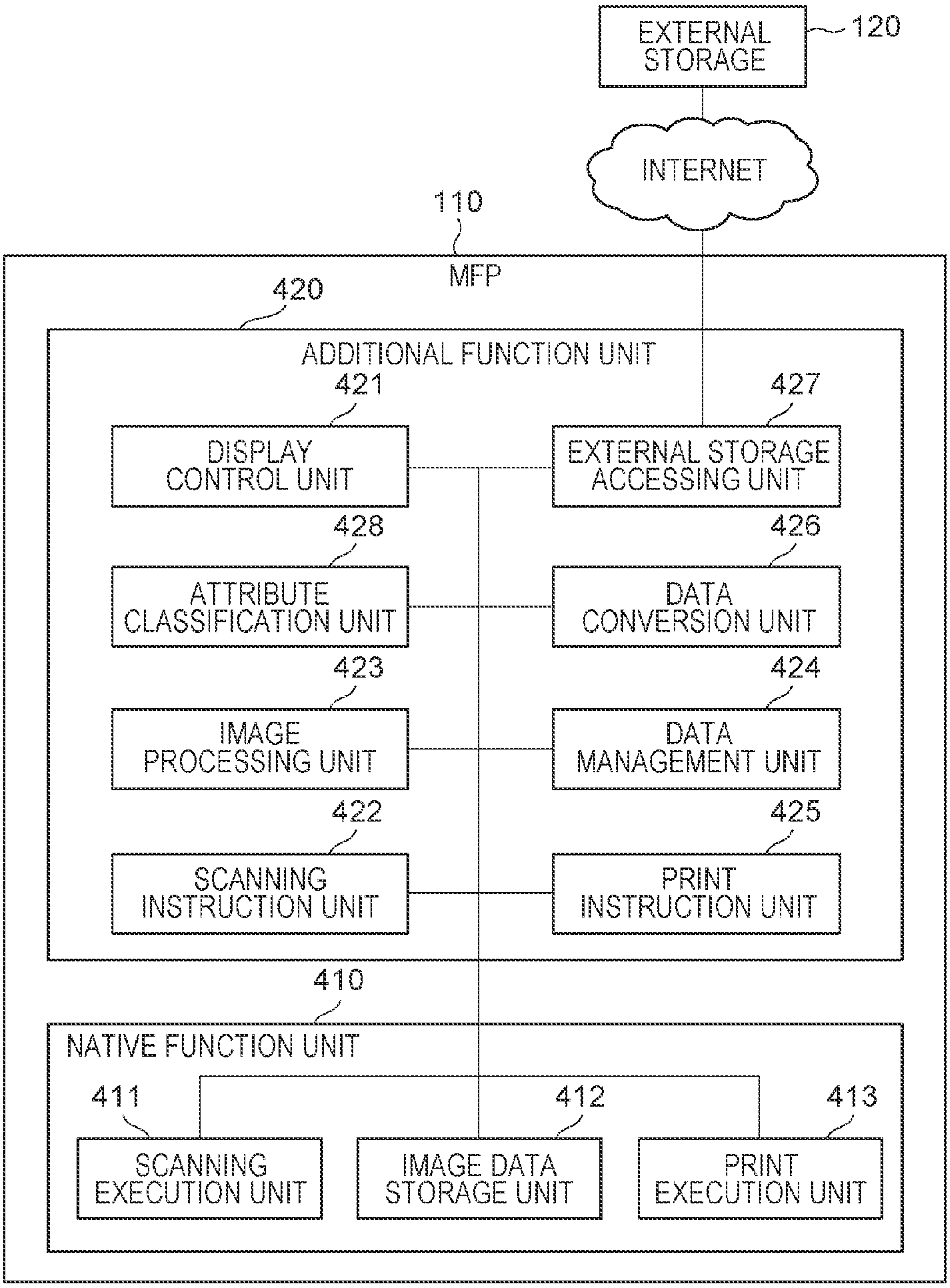
FIG. 4 is a software configuration diagram of this system.

FIG. 4 illustrates a software configuration of the image processing system according to the present embodiment. The MFP 110 is divided into two main units: a native function unit 410 and an additional function unit 420. The individual functional units can be implemented by the CPU 211 loading the programs stored in the ROM 212 or the HDD 214 of the MFP 110 onto the RAM 213 and executing the programs. The units included in the native function unit 410 are the basic functions provided in the MFP 110, whereas the additional function unit 420 includes applications that are additionally installed in the MFP 110. The additional function unit 420 corresponds to Java-based applications (Java is a registered trademark), which facilitate the easy addition of functions to the MFP 110. Other unillustrated additional applications may be installed in the MFP 110.

The native function unit 410 includes a scanning execution unit 411, an image data storage unit 412, and a print execution unit 413. The additional function unit 420 includes a display control unit 421, a scanning instruction unit 422, an image processing unit 423, a data management unit 424, a print instruction unit 425, a data conversion unit 426, and an external storage accessing unit 427.

The display control unit 421 is operable to display a user interface (UI) screen for receiving user's operations, on a liquid crystal display unit with a touch panel function of the operating unit 220 of the MFP 110. For example, the display control unit 421 displays an operation screen for receiving operations of configuring scan settings and starting scanning, operations of previewing scanned images and designating masking areas described later, operations of previewing mask-applied images, and operations of configuring output settings and starting output.

The scanning instruction unit 422 is operable to request a scanning operation that corresponds to the scan settings inputted to the scanning execution unit 411 via the UI screen. The scanning execution unit 411 can receive a scan request including the scan settings from the scanning instruction unit 422. The scanning execution unit 411 is operable to, in response to the scan request, generate scanned image data by reading an original document placed on a document table glass with the scanner 222 using the scanner I/F 217. The generated scanned image data can be transmitted to the image data storage unit 412. The scanning execution unit 411 transmits an image identifier that uniquely indicates a particular stored scanned image data item to the scanning instruction unit 422. The image identifier is represented by numerals, symbols, alphabets, or other elements (not illustrated) that uniquely identifies, for example, a specific image scanned by the MFP 110. The image data storage unit 412 is operable to store in the HDD 214 the scanned image data received from the scanning execution unit 411.

The image processing unit 423 is operable to perform analysis and processing on scanned images. The image processing unit 423 receives the image identifier from the scanning instruction unit 422 and obtains the scanned image data corresponding to the image identifier from the image data storage unit 412. The image processing unit 423 performs recognition operations on obtained image data, such as character area analysis, optical character recognition (OCR), barcode area analysis, image rotation, and tilt correction. The image processing unit 423 in advance has learning data for determining whether a scanned document is a repetitive or non-repetitive document. As a result of analyzing the scanned image, when the scanned image is similar to a repetitive document that has already been learned, the scanned image is identified as a repetitive document. The image processing unit 423 applies mask images based on an area designation operation (illustrated in FIG. 6 described below) corresponding to, for example, masking areas inputted via the UI screen. The image processing unit 423 subsequently instructs the image data storage unit 412 to save the generated mask-applied image data. The image processing unit 423 transmits an image identifier to the print instruction unit 425, the data conversion unit 426, and the external storage accessing unit 427 in accordance with the output settings that are set for the image after mask application.

The data management unit 424 is operable to retain information such as coordinates specified in the area designation operation, text strings, attributes, file names, and save locations, associated with image identifiers. The data management unit 424 is also operable to store in the HDD 214 the coordinates specified in the area designation operation, text strings, attributes, file names and save locations as presets. In the present embodiment, presets refer to templates that store information indicating the coordinates of the areas to be masked in scanned images, text strings, attributes, the file names and save locations of the files containing the scanned images in association with document types. By selecting an option indicating a specific document type displayed as a preset button on a screen 800, which will be described later, processing can be performed using the settings stored in the template, without configurating individual settings again. Attributes will be specifically described later.

The print instruction unit 425 transmits to the print execution unit 413 a request for a print operation according to the print settings inputted via the UI screen and the image identifier received from the image processing unit 423. The print execution unit 413 receives the print request including the print settings and the image identifier from the print instruction unit 425. The print execution unit 413 obtains image data corresponding to the image identifier from the image data storage unit 412 and generates image data for printing in accordance with the print request. The print execution unit 413 prints the mask-applied image on the recording medium using the printer 221 via the printer I/F 216, based on the generated image data for printing.

The data conversion unit 426 obtains from the image data storage unit 412 the image corresponding to the image identifier received from the image processing unit 423 and converts the image into a file format corresponding to the output settings inputted via the UI screen. The data conversion unit 426 obtains from the data management unit the file name corresponding to the image identifier received from the image processing unit 423 and set the file name as the file name of the converted file. The data conversion unit 426 transmits the converted file and the corresponding image identifier to the data management unit 424, and the data management unit 424 stores the received file in association with the image identifier.

The external storage accessing unit 427 transmits a processing request to, for example, a cloud service that provides storage functionalities (storage services). Cloud services provides various interfaces for storing files in cloud storage and retrieving stored files from external devices, generally using protocols such as representational state transfer (REST) or simple object access protocol (SOAP). The external storage accessing unit 426 performs operations on cloud services using the published interface of the cloud services. The external storage accessing unit 427 obtains from the data management unit 424 the file corresponding to the image identifier received from the image processing unit 423 and transmission information. The external storage accessing unit 426 uses the transmission information obtained from the data management unit 424 to transmit the file obtained from the data management unit 424 to the external storage 120 via the network I/F.

The attribute classification unit 428 classifies text strings extracted from the OCR results obtained by the image processing unit 423 into attributes by character recognition operation that enables semantic understanding of OCR text strings or character recognition processing such as key-value extraction. Attributes refer to elements that indicate specific categories of text strings. Examples of attributes include 'date,' 'personal name,''email address,' 'phone number,' 'company name,' 'product name,' and 'document number'. The attribute classification unit 428 stores training data including text strings associated with attributes. By learning from the training data, the attribute classification unit 428 determines which attributes correspond to specific text strings obtained through OCR and classifies the text strings under the attributes. Alternatively, the attribute classification unit 428 stores and manages text strings ('keys') that serve as item names. The attribute classification unit 428 cooperate with the image processing unit 423 to extract keys from text strings obtained by OCR of image data. For example, when the image data contains the text string 'Date: ## (month)/## (date),' 'Date' is extracted as a key. The attribute classification unit 428 accordingly detects the text string ('value') corresponding to the key based on, for example, the positional relationship between the key and the text string. The attribute classification unit 428 classifies the value in association with the attribute of the item name of the key. Alternatively, the attribute classification unit 428 previously manages the attributes and the regular expressions of the text strings corresponding to the individual attributes. The regular expressions may be set by the users. The attribute classification unit 428 may cooperate with the image processing unit 423 to classify particular text strings among the text strings obtained by OCR of image data under corresponding attributes, when the text strings match the preset regular expressions. In this case, an attribute selection screen 1700 described later may be configured to receive from the users the specification of regular expressions of text strings corresponding to the individual attributes. The OCR text strings classified under the attributes can be associated with attribute names as illustrated in FIG. 16 and stored in the RAM 213.

Overall Process Flow

The process described below can be implemented by the CPU 211 of the MFP 110 reading the control programs stored in the ROM 212 and the HDD 214 and executing and controlling the different functions that the MFP 110 has and the functions of the additional applications.

Figure 5:
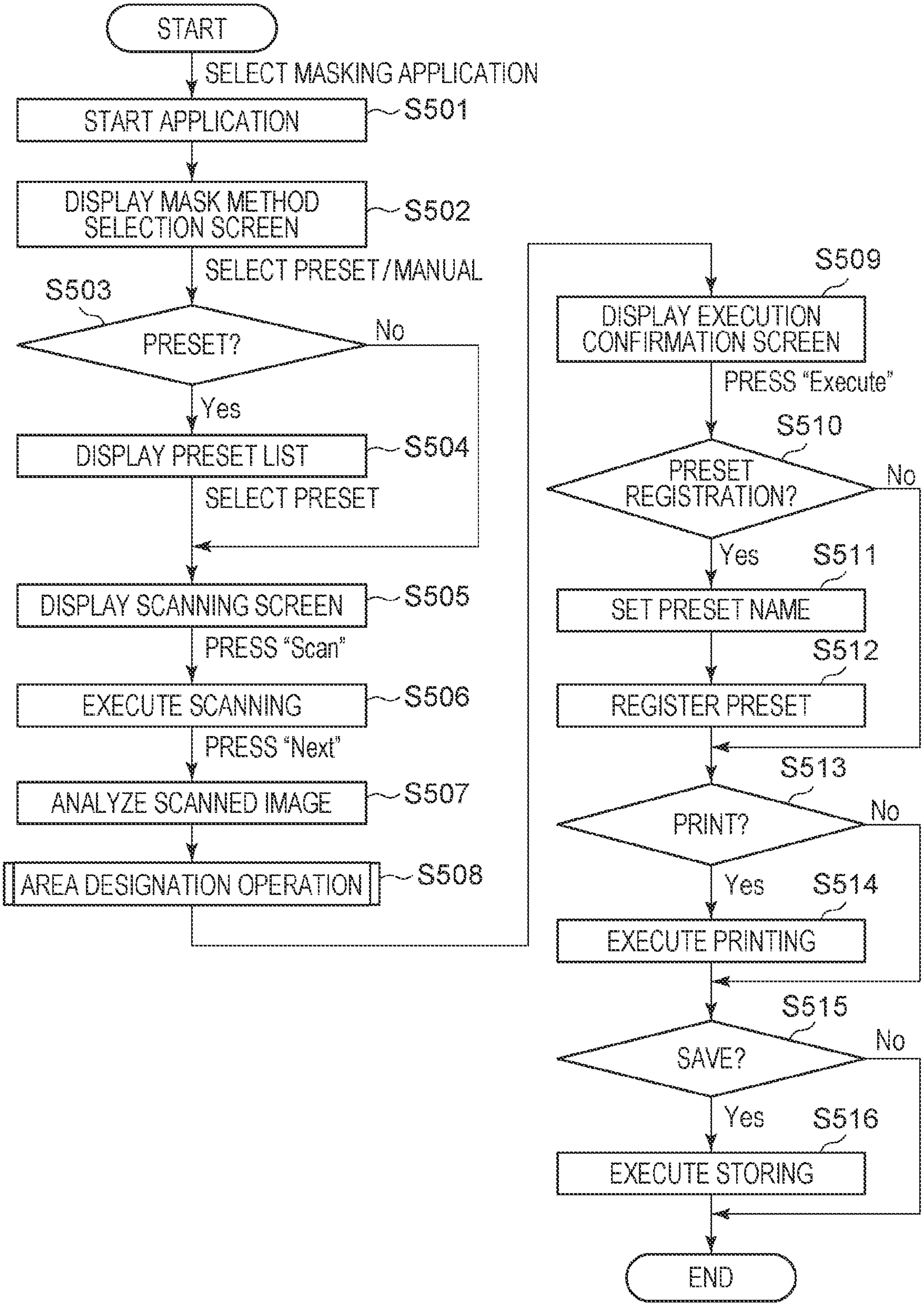
FIG. 5 is a flowchart illustrating a process flow implemented by the MFP of this system.

FIG. 5 is a flowchart illustrating a process flow for applying a mask image to an image scanned by the MFP 110, filing the image, and sending the image to cloud storage (the external storage 120). In the present embodiment, the example in which the display control unit 421 displays screens on the touch panel of the operating unit 220 is described. However, the display control unit 421 may be configured to provide the screens in the present embodiment to another device, and the operating unit of the device may display the screens.

The display control unit 421 displays a main screen (not illustrated) on the touch panel of the operating unit 220. Buttons for executing applications provided by the MFP 110 are arranged on the main screen.

An additional application for masking some areas of a scanned image and transmitting the image to a cloud service (hereinafter referred to as the masking application) according to the present disclosure can be used when the application is installed in the MFP 110. When the masking application is installed in the MFP 110, a button for using the function of the application is displayed on the main screen of the MFP 110.

When it is detected that the masking application button is pressed, the flow illustrated in FIG. 5 starts, and the MFP 110 starts the masking application (reads and executes the program) in S501.

Figure 7:
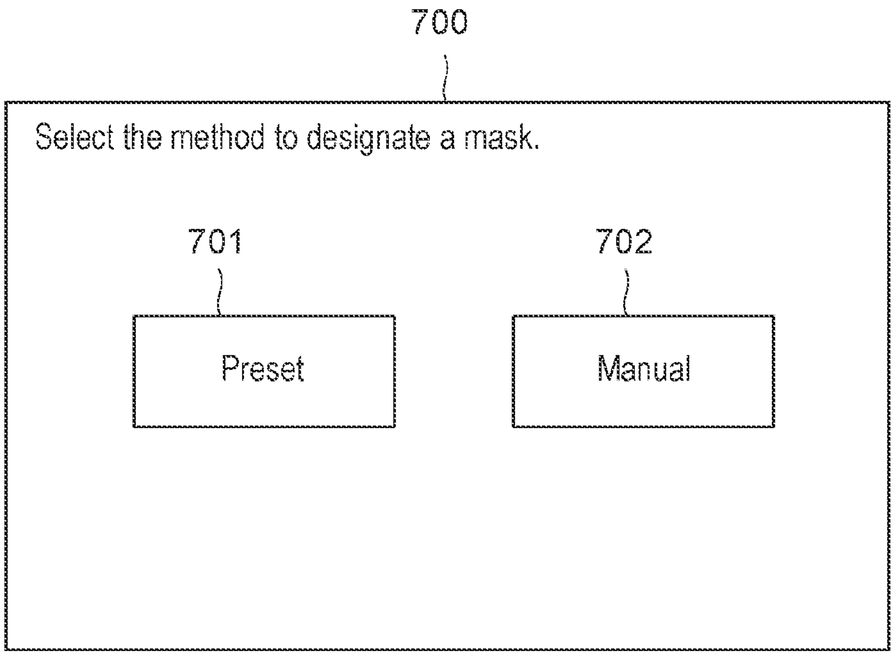
FIG. 7 illustrates an example of a mask designation method selection screen displayed by the MFP.

After the masking application is started, in S502, the display control unit 421 of the MFP 110 displays the mask setting method selection screen 700 in FIG. 7 as the initial screen of the masking application. Reference numeral 701 indicates a button that provides an instruction for the MFP 110 to display the screen 800. The screen 800 will be described later. Preset refers to a function of storing previously configured values in the HDD 214 of the MFP 110 for reuse. The configured values include scan settings, masking areas, file storage information, and other values. Reference numeral 702 indicates a button that provides an instruction to manually configure various settings based on initial values in the masking application. When it is detected that the user has selected either button on the mask setting method selection screen 700, the display control unit 421 determines in S503 whether 'Preset' indicated by 701 or 'Manual' indicated by 702 is selected.

Figure 9:
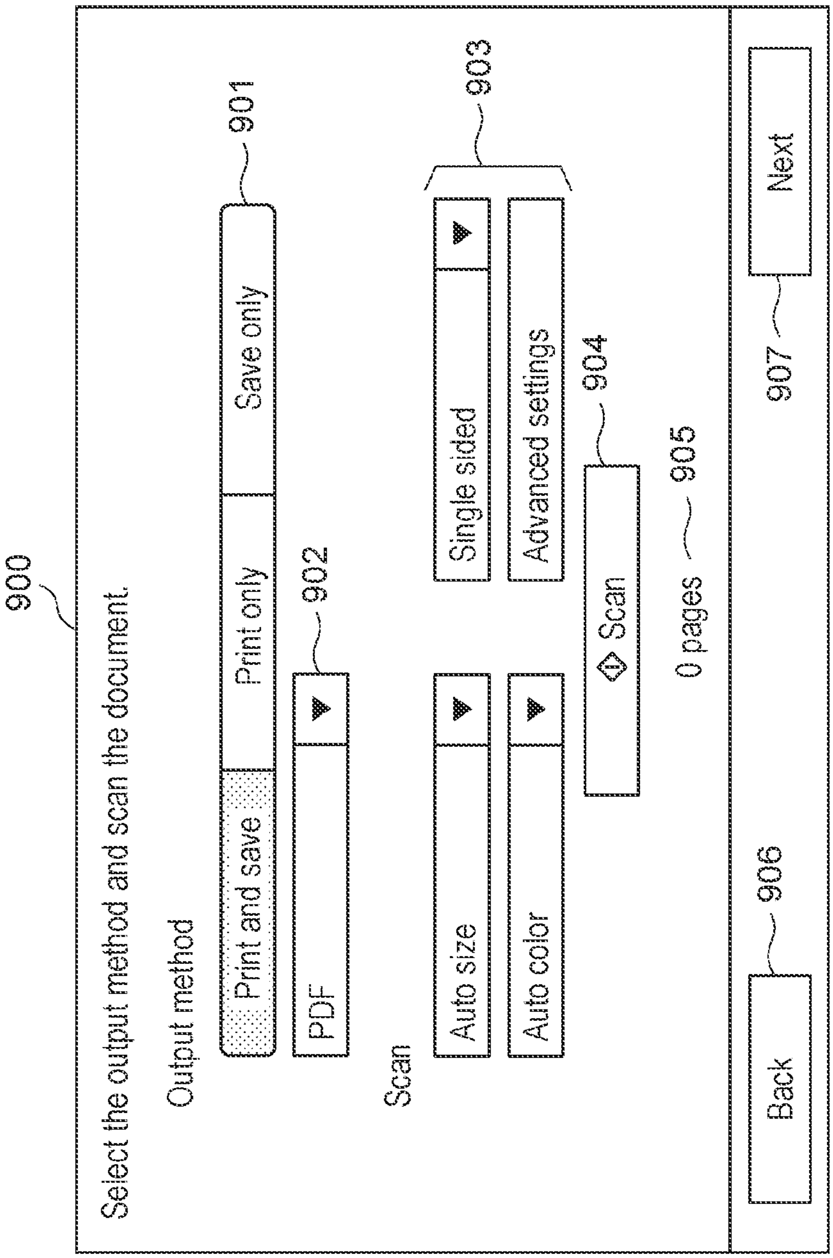
FIG. 9 illustrates an example of a scanning screen displayed by the MFP.

When it is detected that 'Manual' indicated by 702 is selected, the determination in S503 is 'No,' and in S505, the display control unit 421 displays a scanning screen 900 in FIG. 9. Reference numeral 901 indicates an option for designating an output method for outputting the mask-applied scanned image. The output method can be selected from print only, save only, and print and save. Reference numeral 902 indicates an option for designating a file save format to be used when the setting of reference numeral 901 is 'print and save' or 'save only'. Reference numeral 903 indicates an option for configuring scan settings, in other words, receiving setting changes of 'document size,' 'color,' 'double-sided,' and 'advanced settings'. In 'advanced settings,' settings such as resolution, image quality, document size mixing, and density can be changed. Reference numeral 904 indicates a button for executing scanning in accordance with the scan settings configured using 903. Reference numeral 905 indicates an area that displays the number of pages that have been scanned. Reference numeral 906 indicates a button for returning to the previous screen. When the determination in S503 is 'No,' the scanning screen 900 is displayed in the state in which the output settings and scan settings that the MFP 110 retains as the initial values in the masking application are set to 901 to 903.

Figure 8:
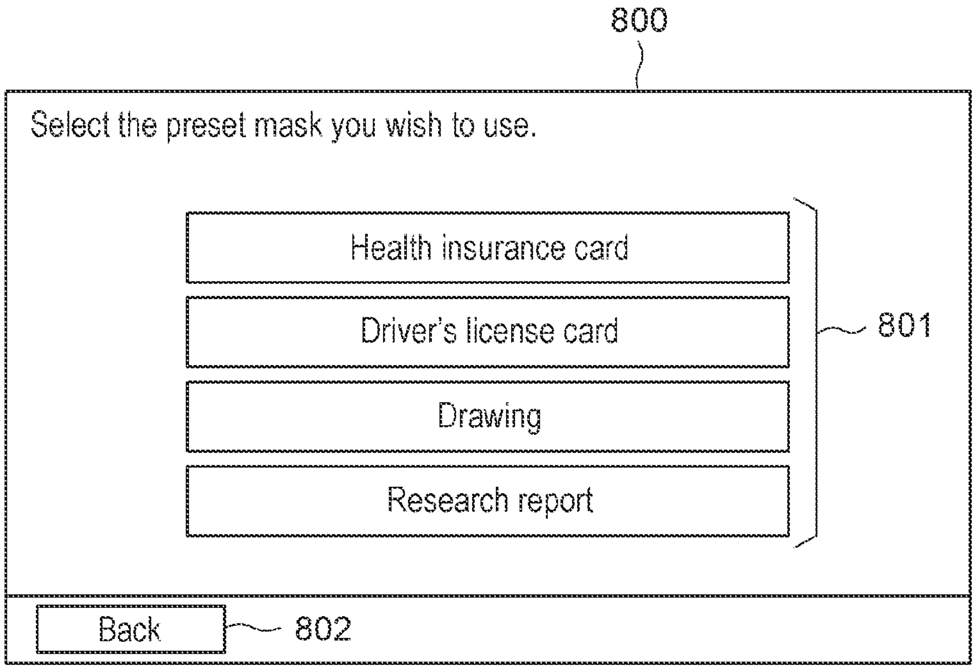
FIG. 8 illustrates an example of a preset selection screen displayed by the MFP.

When it is detected that 'Preset' in 701 is selected, S503 is 'Yes,' and in S504 the display control unit 421 displays the preset list screen 800 in FIG. 8. Reference numeral 801 indicates an example of registered preset buttons. The preset buttons correspond to the templates stored in the data management unit 424. When it is detected that one of the preset buttons has been selected, the template settings stored in association with the button ID of the preset button are used in the subsequent operations. The button ID refers to an ID generated by the data management unit 424 when a corresponding preset button is registered. The ID is represented by numerals, symbols, alphabets, or other elements that uniquely identify a group of registered settings (not illustrated). Reference numeral 802 indicates a button for returning to the mask setting method selection screen 700 in FIG. 7. For example, when it is detected that 'Research report' in 801 is selected, the display control unit 421 reads the settings associated with the button ID for 'Research report' and displays the scanning screen 900. At this time, the settings associated with the button IDs are applied to the output settings and scan settings in 901 to 903.

When the operating unit 220 detects that the user has placed the scan target document on the document table glass or ADF and pressed the 'Scan' button in 904, the MFP 110 performs scanning and generates an image identifier that uniquely indicates the image data obtained by digitizing the document in S506. The generated scanned image and image identifier are stored in the HDD 214 in an associated manner. Every time the MFP 110 completes generating a scanned image for one page, the number of scanned pages in 905 increases.

When it is detected that the scanning of the scan target document is completed and the 'Next' button in 907 is pressed, the image processing unit 423 performs an analysis operation on the scanned image in S507. In the scanned image analysis operation, the image processing unit 423 detects character areas in the image and obtains the coordinates of the detected character areas. The image processing unit 423 also performs a character recognition operation on the scanned image to extract text strings in the detected character areas. The image processing unit 423 may perform a character recognition operation only on the image data contained in the detected character area. The coordinates of the obtained character areas and information of the extracted text strings are subsequently stored as analysis results in the HDD 214 in association with the image identifiers. The attribute classification unit 428 classifies text strings obtained through the character recognition operation by the image processing unit 423 under the attributes using the method described above.

Figure 6:
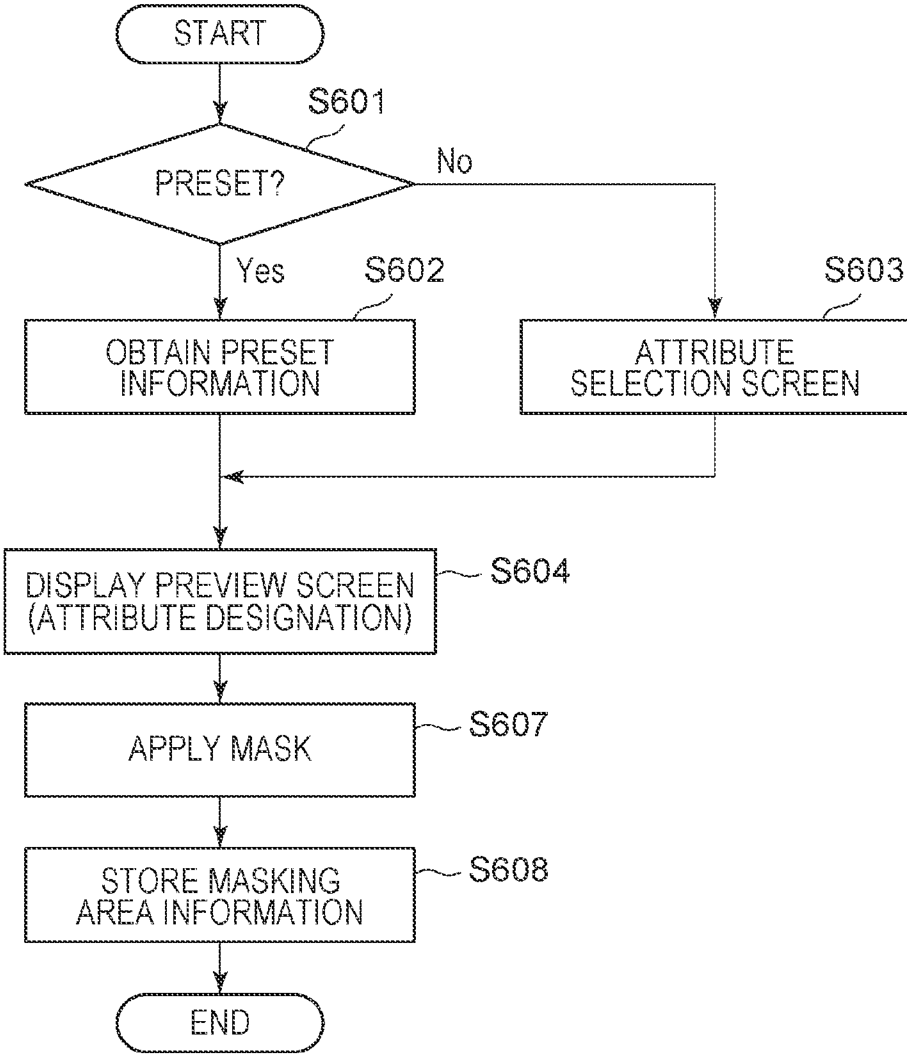
FIG. 6 is a flowchart of an area designation operation performed by the MFP of this system.

After the analysis of the scanned image in S507 is completed, the MFP 110 performs the area designation operation in S508. The area designation operation refers to an operation of receiving designation of areas to be masked in the scanned image and generating an image in which the designated areas are masked. In the present embodiment, specific areas to be masked can be designated by selecting the text strings to be masked among the text strings extracted in the scanned image or by selecting the attributes of the text strings to be masked. FIG. 6 is a flowchart of sub-operations performed in the area designation operation in S508. In the area designation operation in S508, different sub-operations can be performed depending on whether 'Preset' is selected on the mask setting method selection screen 700. First, in S601, the display control unit 421 determines whether 'Preset' is selected on the mask setting method selection screen 700. When 'Preset' is selected in S601, the display control unit 421 obtains preset information from the data management unit 424 in S602. When 'Manual' is selected in S601, the preset information is not obtained, and the operation moves to S604.

Figure 17:
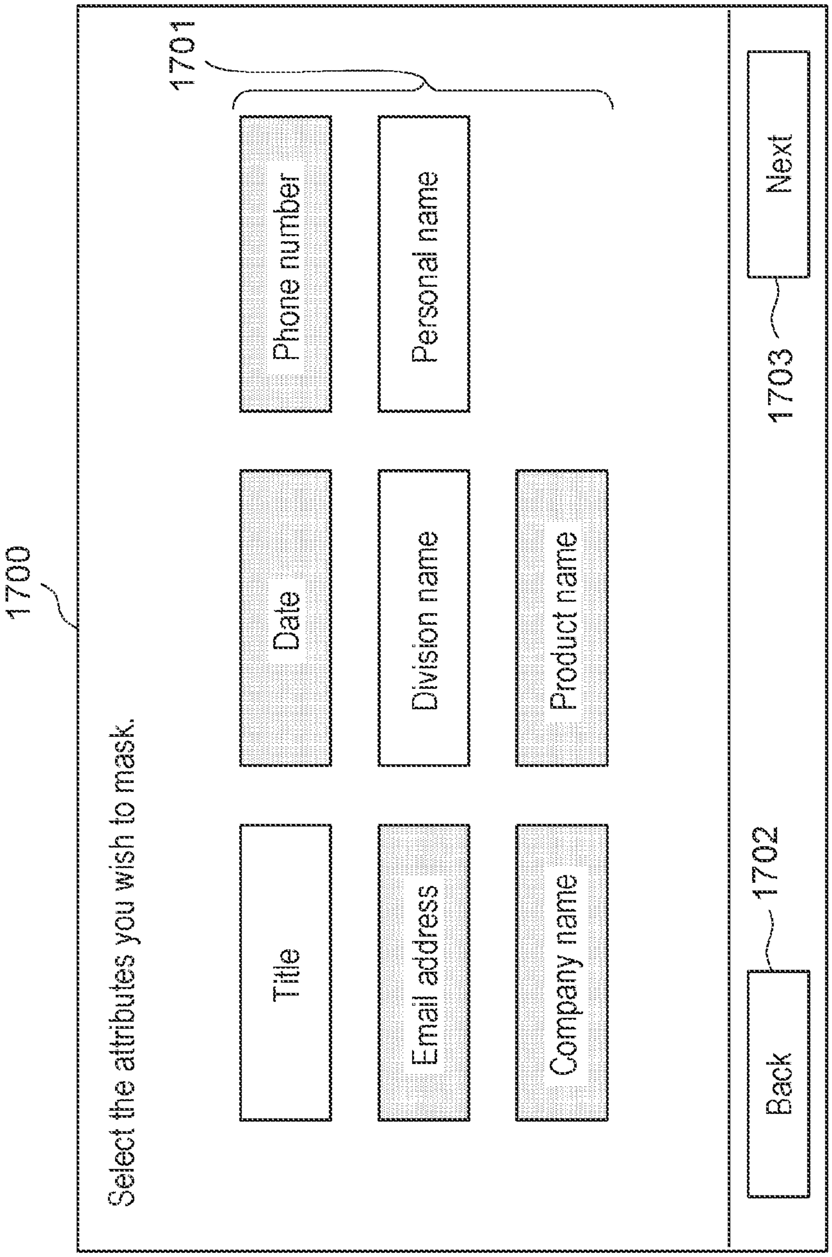
FIG. 17 illustrates an example of a screen for selecting attributes to be displayed by the MFP.

When it is determined that 'Preset' is not selected in S601, the operation proceeds to S603, and the display control unit 421 displays the attribute selection screen 1700 in FIG. 17. The attribute selection screen 1700 displays the attribute names of the particular attributes under which the text strings extracted in S507 are classified. Reference numeral 1701 indicates an area that displays a list of attribute names. The areas that display the individual attribute names are configured as buttons for receiving inputs from the user. When a specific attribute name button is pressed, the background color of the button changes to indicate that the button is selected. Reference numeral 1702 indicates a button for returning to the mask setting method selection screen 700. Reference numeral 1703 indicates a button for moving to a preview screen 1000 (described later) for masking area designation in FIGS. 10A and 10B. The attribute names selected by pressing the button 1701 can be retained in the RAM 213.

Figure 10A:
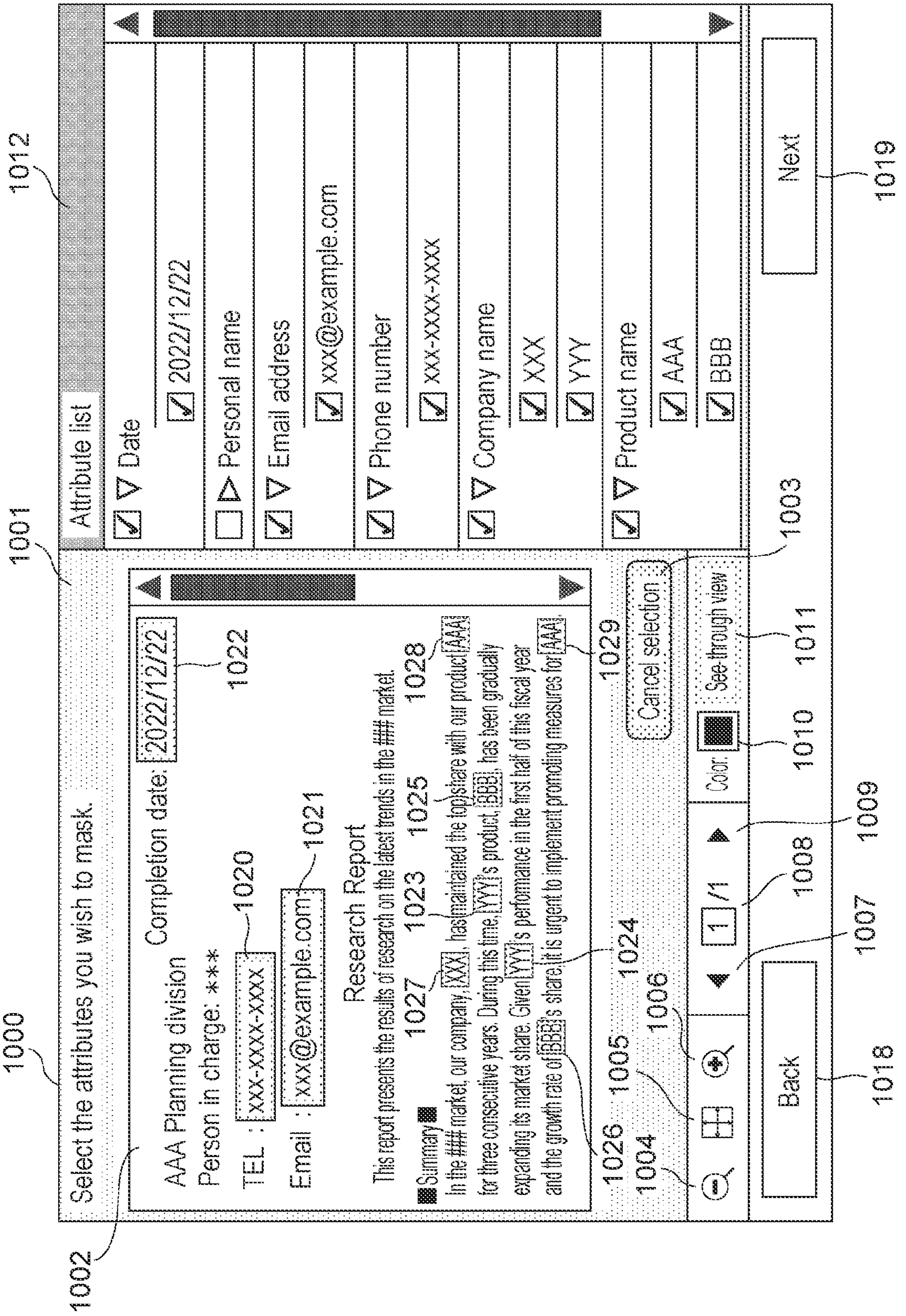
FIGS. 10A and 10B illustrate examples of a preview screen displayed by the MFP.
Figure 10B:
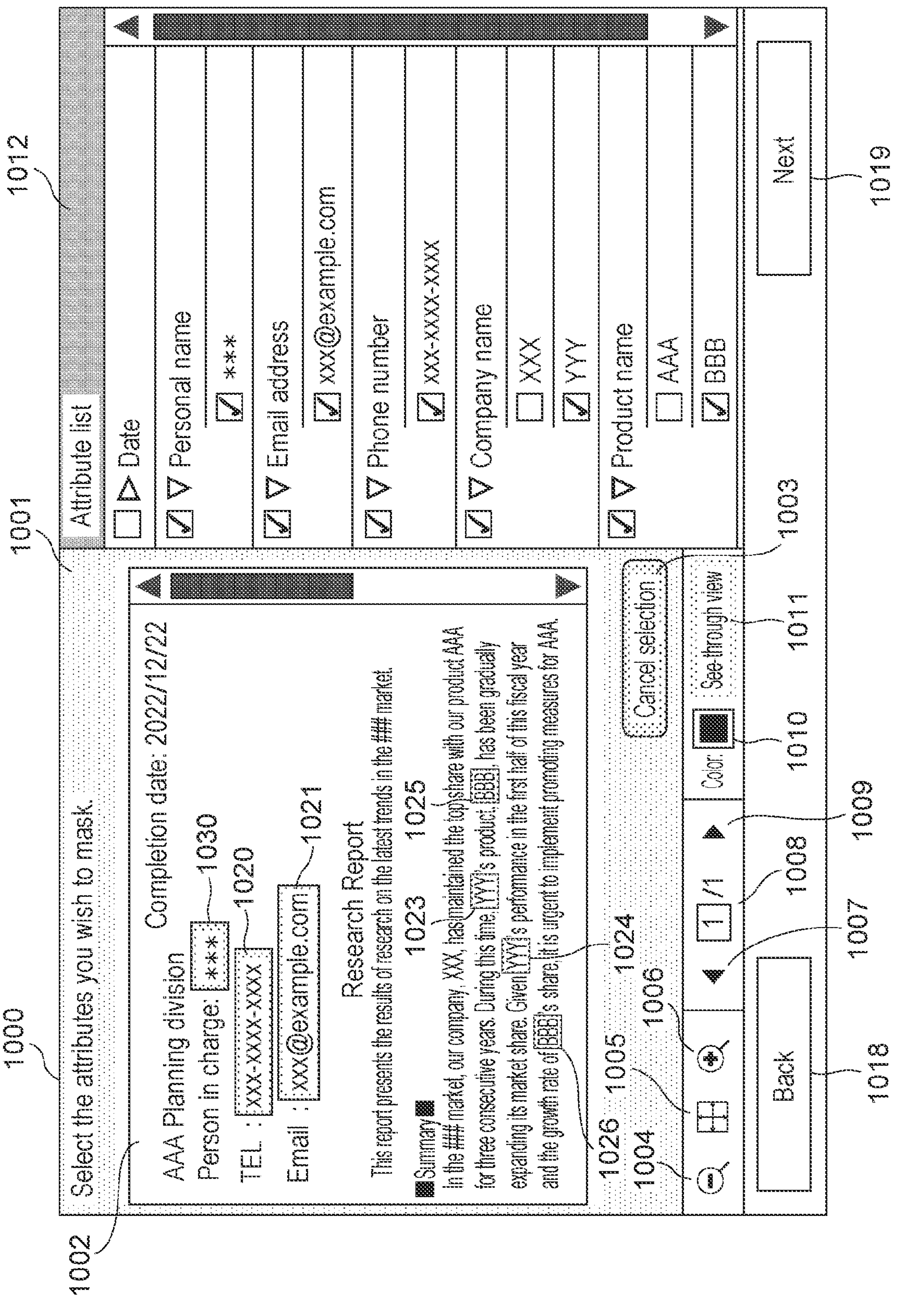

In S604, the display control unit 421 displays the preview screen 1000 in FIGS. 10A, 10B, and 10C. FIG. 10A is an example of the preview screen 1000 when the preview screen 1000 is firstly displayed in S604. When 'Preset' is not selected in S601, the display control unit 421 obtains the information of the attributes selected using the attribute selection screen 1700 in S603 and reflects the selections in the preview screen 1000. Specifically, the display control unit 421 obtains information of the attributes such as 'date' and 'phone number' selected on the attribute selection screen 1700. The display control unit 421 subsequently cooperate with the attribute classification unit 428 to obtain text strings obtained through OCR that are classified under the obtained attributes. The operation of classifying text strings obtained through OCR under the attributes can be performed by the attribute classification unit 428 in the manner described above. Based on the obtained information of the attributes and the text strings obtained through OCR, the display control unit 421 displays the OCR text strings corresponding to the attributes on the preview screen 1000 in the manner in which the OCR text strings are masked. Masking refers to the operation of displaying the target text strings in the manner in which the rectangular areas enclosing the target text strings are filled in. The display control unit 421 also displays in an attribute list display area 1012 information of all the attributes managed by the attribute classification unit 428, including attributes not selected on the attribute selection screen 1700, and the text strings obtained through OCR classified under the individual attributes. Reference numeral 1012 indicates an attribute list display area that displays OCR text strings in association with the attributes. At this time, the display control unit 421 displays the text strings obtained through OCR corresponding to the specific attributes selected on the attribute selection screen 1700, in other words, the text strings masked on the preview screen 1000, in the selected state in 1012.

When 'Preset' is selected in S601, the display control unit 421 obtains information of the attributes registered in the template corresponding to the selected preset button in S602. The display control unit 421 subsequently cooperate with the attribute classification unit 428 to obtain text strings obtained through OCR that are classified under the obtained attributes. The operation of classifying text strings obtained through OCR under the attributes can be performed by the attribute classification unit 428 in the manner described above. Based on the obtained information of the attributes and the text strings obtained through OCR, the display control unit 421 displays the OCR text strings corresponding to the attributes in the manner in which the OCR text strings are masked. The display control unit 421 also displays in an attribute list display area 1012 information of all the attributes managed by the attribute classification unit 428, including attributes not contained in the template, and the text strings obtained through OCR classified under the individual attributes. At this time, the display control unit 421 displays the text strings obtained through OCR corresponding to the specific attributes selected on the attribute selection screen 1700, in other words, the text strings masked on the preview screen 1000, in the selected state in 1012.

The display control unit 421 displays attributes and the OCR text strings in a tree structure in the attribute list display area 1012. In the display, the parent corresponds to the attribute names, and the child corresponds to the OCR text strings. In other words, one or more OCR text strings classified under each attribute are displayed in association with the attribute. The display control unit 421 displays checkboxes for the attributes and the OCR text strings in the attribute list display area 1012. The checkboxes can be used to receive tap operations to determine whether to select the corresponding attributes and the corresponding OCR text strings as masking targets. The display control unit 421 receives operations by the user to select or deselect the individual OCR text strings using the checkboxes.

Specifically, when the user performs an operation of checking a checkbox for a specific OCR text string, the operation is received as a designation to select the OCR text string. Based on the designation, an instruction to mask the OCR text string is received. In response to this, the OCR text string is masked on the preview screen 1000.

When the user performs an operation of unchecking a checkbox for a specific OCR text string, the operation is received as a designation to deselect the OCR text string. Based on the designation, an instruction to unmask the OCR text string is received. In response to this, the OCR text string is unmasked on the preview screen 1000.

When the user performs an operation of checking a checkbox for a specific attribute, the operation is received as a designation to select all the OCR text strings associated with the attribute. Based on the designation, an instruction to mask all the OCR text string associated with the attribute is received. In response to this, all the OCR text string are masked on the preview screen 1000.

When the user performs an operation of unchecking a checkbox for a specific attribute, the operation is received as a designation to deselect all the OCR text string associated with the attribute. Based on the designation, an instruction to unmask all the OCR text strings associated with the attribute is received. In response to this, all the OCR text string is unmasked on the preview screen 1000.

The display control unit 421 also displays a scroll bar when the displayed OCR text strings does not fit in the attribute list display area. In the present embodiment, the correspondences between the attributes and OCR text strings are represented in a tree structure. However, other representation methods such as a list structure may be used, provided that the attributes and OCR text strings can be associated with each other. The attribute list display area 1012 simplifies operations of adding and deleting the attributes and text strings as masking targets.

When specific attributes registered in presets are locked using an attribute locking function that will be described later, the display control unit 421 provides control to prevent the specific attributes targeted by the attribute locking function from being unlocked in the attribute list display area 1012. For example, the attributes targeted by the attribute locking function and the corresponding checkboxes, as well as all the OCR text strings associated with the attributes and the corresponding checkboxes, are grayed out so that the elements cannot be deselected. Attribute locking is effective to prevent the operators of this application from accessing confidential information such as personal information. Hence, the attribute locking function may be controlled to be used under specific user authorities. For example, the attribute locking function may be used when the user calling a preset and performing operation on the preset possesses a given authority. Specifically, when a user information management unit (not illustrated) of the MFP 110 determines that the attribute lock setting described later is enabled for at least one attribute in the called preset, the user information management unit examines the information about the user logged into the MFP 110. When the information indicates a general user, the display control unit 421 is notified that the information indicates a general user. When the display control unit 421 receives information indicating that the information indicates a general user, the display control unit 421 provides display control so that the OCR text strings of the attributes on which attribute locking is enabled in presets cannot be deselected.

Reference numeral 1001 indicates an area that displays a preview of the image scanned in S506. Reference numeral 1002 indicates a preview image of the image scanned in S506. When the preview image does not fit on the screen, a scroll bar can be automatically displayed.

Reference numeral 1003 indicates a button for deselecting the masking areas selected in the preview image 1002. When the display control unit 421 detects that a specific OCR text string selected as a masking target is touched by a finger on the image data of the preview image, the display control unit 421 recognizes the touched OCR text string as selected for subsequent operations. When the display control unit 421 detects that a selection cancelling button 1003 is pressed following the selection, the display control unit 421 removes the OCR text string from masking targets. Specifically, the display control unit 421 firstly remove the mask from the preview image 1002. The display control unit 421 also cancels selections in the attribute list display area 1012 described later.

Specifically, the display control unit 421 unchecks the checkbox corresponding to the OCR text string. When all the text strings included in a specific attribute that the unchecked text string belongs to becomes unselected after unchecking the text string, the specific attribute is also deselected.

Reference numeral 1004 indicates a button for display in a reduced manner by decreasing the display magnification of the preview image 1002 by a certain amount. Reference numeral 1005 indicates a button for changing the magnification to the maximum value that enables the entire preview image 1002 to fit within the preview area 1001. Reference numeral 1006 indicates a button for display in an enlarged manner by increasing the display magnification of the preview image 1002 by a certain amount. Reference numeral 1007 indicates a button for displaying the scanned image of a previous page when multiple pages of scanned images are involved. Reference numeral 1008 displays the page number of the currently displayed scanned image and the total number of pages. Reference numeral 1009 indicates a button for displaying the scanned image of a subsequent page when multiple pages of scanned images are involved.

Reference numeral 1010 indicates a mask color designation button for designating the color of masking areas that will be described later. The colors used to fill in the masking area may refer to not only single colors but also painting effects such as blurring and stamping. In other words, the button 1010 is described as a mask color designation button in the present embodiment, but this is not to be interpreted as limiting. The button may be used to select the mask image type. For example, the color and pattern of the mask image may be selectable.

Reference numeral 1011 indicates a toggle button for displaying the masking areas in a semi-transparent manner on the preview. When the selection to enable the setting for see-through view is received via 1011, the display control unit 421 masks and displays the text strings selected as masking targets in a see-through manner that renders the text strings visible. When the selection to unable the setting for see-through view is received via 1011, the display control unit 421 masks and displays the text strings selected as masking targets in a non-see-through manner that renders the text strings invisible. Reference numeral 1018 indicates a button for return to the previous operation. In the case in which 'Preset' is selected in S601, the display control unit 421 displays the scanning screen 900 in response to detecting that the button 1018 is pressed. In the case in which 'Preset' is not selected in S601, the display control unit 421 displays the attribute selection screen 1700 in response to detecting that the button 1018 is pressed. Reference numeral 1019 indicates a button for proceeding to the subsequent operation. The display control unit 421 displays an execution confirmation screen 1200 (described later) in FIG. 12 in response to detecting that the button 1019 is pressed.

In the present embodiment, the method of designating the masking areas by using the attributes is described. However, the masking areas may also be additionally designated using other methods such as text string designation or coordinate designation. Text string designation refers to the method in which the user designates text strings to be masked. The display control unit 421 searches the text strings extracted in the scanned image for the designated text strings and selects the text strings as masking targets. Coordinate designation refers to the method in which the user designates the areas to be masked in the scanned image. The display control unit 421 detects touch operations by the user and sets the corresponding areas as the areas to be masked. Multiple area designation methods may be used on a single screen.

Reference numerals 1020 to 1030 indicates that the display control unit 421 masks and displays the OCR text strings included in the preset or in the attributes selected on the attribute selection screen 1700. Before receiving the user's designation to select or deselect the specific text strings, the display control unit 421 displays the screen 1000 with 1020 to 1030 being masked. The display control unit 421 also displays the masked OCR text strings being checked in the attribute list display area 1012. Among the attributes displayed in the attribute list display area 1012, the attributes for which all of the corresponding OCR text strings are selected are checked.

FIG. 10B illustrates an example of the preview screen 1000 after the user has edited the masking areas. Specifically, FIG. 10B illustrates the state after the user has issued instructions to add or delete masking targets, subsequent to the display of the preview screen 1000 in FIG. 10A. When the display control unit 421 receives an instruction to deselect the attribute name 'date' in the attribute list display area 1012, the display control unit 421 removes the mask image displayed in 1022 and displays the text string of the 'date' attribute without masking. When the display control unit 421 receives instructions to deselect the OCR text strings 'XXX' and 'AAA' in the attribute list display area 1012, the display control unit 421 removes the mask images that hide 'XXX' and 'AAA' among the mask images displayed at 1027 to 1029. The display control unit 421 then displays the text strings 'XXX' and 'AAA' without masking. When the display control unit 421 detects that the attribute name 'personal name' in the attribute list display area 1012 is newly selected, the display control unit 421 displays a mask image 1030 and masks the text string '****' associated with 'personal name'.

FIG. 13A provides area information 1300 about the areas designated in the preview screen in FIG. 10A, such as coordinates, retained in the RAM 213. When it is detected that a specific masking area is designated on the preview screen, the display control unit 421 stores the area information 1300 in the data management unit 424. Reference numeral 1301 indicates IDs that uniquely indicate area information records. Reference numeral 1302 indicates types of elements used in designating areas. The type 1302 includes 'attribute' as well as 'coordinates' and 'text'. The type 'attribute' indicates masking areas designated by selecting specific attributes on the preview screen in FIG. 10A. The type 'coordinates' indicates masking areas designated by specifying coordinates. The type 'text' indicates masking areas designated by selecting specific text strings. Reference numeral 1303 indicates area start points. The coordinates in the horizontal and vertical directions are represented in the format (X, Y), with the origin located at the upper left corner of the scanned image. Reference numeral 1304 indicates area end points. Overall, the target area forms a rectangle, with the coordinates 1303 representing the upper left point and the coordinates 1304 representing the lower right point. The text string coordinate information can be obtained through image analysis such as OCR by the image processing unit 423. Reference numeral 1305 indicates RGB color values. Reference numeral 1306 indicates OCR text strings as masking targets. It can be seen that the area information 1300 stores ten masking areas (MSK1-10) that correspond to the area information about the preview area 1001 in FIG. 10A.

FIG. 13B provides area information 1300 about the areas designated in the preview screen in FIG. 10B, such as coordinates, retained in the RAM 213. In FIG. 10B, masking targets 1022 (2022/12/22), 1027 (XXX), 1028 (AAA), and 1029 (AAA) are deleted from the area information, and 1030 (*) is newly added as a masking target. It can be seen that the area information 1300 stores eight masking areas (MSK1 to 7) that correspond to the area information about the preview area 1001 in FIG. 10**B.

In S607, the image processing unit 423 applies images of the designated color onto the areas designated as the masking areas in the operation in S604 of the scanned image and stores the scanned image in the HDD 214. In other words, mask images are applied onto the areas corresponding to the text strings selected in the attribute list display area 1012 to generate a mask-applied image. In S608, the masking area information used in the mask application in S607 is stored in the HDD 214 in association with the image identifier of the scanned image data. The stored masking area information corresponds to the information presented in FIGS. 13A and 13B. The foregoing has described the sub-operations performed in the area designation operation in S508.

After the area designation operation in S508 is completed, the display control unit 421 displays the execution confirmation screen 1200 in FIGS. 12A, 12B, and 12C in S509.

Reference numeral 1201 indicates a print setting display area that is displayed when an option involving print is selected in the output method 901 in FIG. 9. In the print setting display area 1201, an option for specifying the number of copies and an 'other print settings' button are provided. When the 'other print settings' button is pressed, a screen (not illustrated) is displayed. The screen allows changes to settings such as double-sided printing, paper size, and imposition. Reference numeral 1202 indicates a save setting confirmation display area that is displayed when an option involving save is selected in the output method 901 in FIG. 9. The save setting confirmation display area 1202 displays the set values of save location and file name that are configured in FIGS. 12B and 12C.

Reference numeral 1206 indicates a button for displaying an edit screen used to configure settings regarding the external storage and folder path that identify the save location. When it is detected that the save location editing button 1206 is pressed, the display control unit 421 displays a save location setting screen 1210 in FIG. 12B on the execution confirmation screen 1200.

Reference numeral 1211 indicates an option for setting the external storage to which scanned images are sent. In this example, 'Cloud A' is selected. When it is detected that a storage is designated by the operation using 1211, the MFP 110 initiates a connection to the external storage configured through 1211. When authentication is required to access the external storage configured through 1211, a screen (not illustrated) used for authentication is displayed. Once authentication is completed, a list 1213 (described later) of folders available in the external storage configured with 1211 is displayed, and the user can select a desired folder and change the folder path.

Reference numeral 1212 indicates an area that displays the currently selected folder path under the external storage configured through 1211. It can be seen that the folder path is set to 'research report' in the example in FIG. 12B.

Reference numeral 1213 indicates a list of folders available in the external storage. The user can select a desired folder and change the folder path. When a specific folder is selected, the folder path is displayed in the folder path display area 1212.

Reference numeral 1214 indicates a button for discarding changes made in the save location setting screen 1210 and returning to the execution confirmation screen 1200.

Reference numeral 1215 indicates a button for confirming and saving changes made in the save location setting screen 1210 and returning to the execution confirmation screen 1200. When it is detected that the confirm button 1215 is pressed, the MFP 110 saves the settings and displays the set information in the save settings confirmation display area 1202. At this time, the storage name and the folder path are connected in series and displayed so that the user can see the save location path. It can be seen that in the save setting confirmation display area 1202 in FIG. 12B 'Cloud A' is set as the external storage, and 'research report' as the save location folder path.

Reference numeral 1207 indicates a button for displaying an edit screen that allows changes to the file name setting. When it is detected that the file name edit button 1207 is pressed, the MFP 110 displays a name input screen 1220 in FIG. 12C on the execution confirmation screen 1200.

Reference numeral 1221 indicates an area that displays the set file name. Reference numerals 1222 and 1223 indicate areas that display buttons used to input a file name. Reference numeral 1222 indicates an area that displays buttons for inputting fixed texts. Given texts and pre-defined delimiters (for example, hyphen, underscore, and blank) can be included in the file name. When 'Text' is selected, a keyboard for text input (not illustrated) is displayed on the touch panel, and the user can input any text. Reference numeral 1223 indicates an area that displays a button for including date and time information about the date and time of the scan in the file name. By using the buttons in this date and time area 1223 to input the date and time information in the file name, the date and time information can be easily included in the file name. Reference numeral 1224 indicates a name rule display area that indicates which buttons in the areas 1222 and 1223 are used for name input. When the buttons in the fixed value area 1222 are used for input, the corresponding text is displayed in the name rule display area 1224. When the buttons in the other area are used for input, a format [variable name] is used for display. The information regarding the button names in the area appears in the field [variable name]. In FIG. 12C, it can be seen from the name rule display area 1224 that the 'year,' 'month,' and 'day' buttons in the date and time area 1223 are used as information other than the fixed value.

Reference numeral 1225 indicates a button for deleting the text string inputted in the file name field. The delete button 1225 deletes from the text string at the end of the file name. When the deletion target is not fixed values, the text strings corresponding to [variable name] in the name rule display area are deleted together in a single deletion. Specifically, when it is detected that the user presses the delete button 1225 on the screen in FIG. 10(*c*), the entire text string '05' is deleted. At this time, [day] that corresponds to the deleted text string is also deleted from the name rule display area 1224. Reference numeral 1226 indicates a button for cancelling edits made on the name input screen 1220 and returning to the execution confirmation screen 1200. Reference numeral 1227 indicates a button for confirming and saving edits made on the name input screen 1220 and returning to the execution confirmation screen 1200. The confirmed file name is displayed in the save setting confirmation display area 1202. The settings in the name rule display area 1224 are stored as preset button settings when the preset buttons are registered, which will be described later. As such, the values inputted using variable values other than fixed values can change according to the actual date and time of the scan and the information obtained from the scanned image.

Reference numeral 1203 indicates an option for registering currently designated areas and setting information as a preset. Referring to S503 and S504, the operations of receiving a selection of a template that stores information of scan settings and masking settings has been described. In the present embodiment, the settings newly configured or changed from the template in S505, S508 and S509 can be stored in the data management unit 424. New templates can be registered in association with preset names described later. Existing templates can be updated by designating existing preset names. For example, when a specific preset is selected in S503 and S504, the template can be updated by designating the same preset name.

Figure 11:
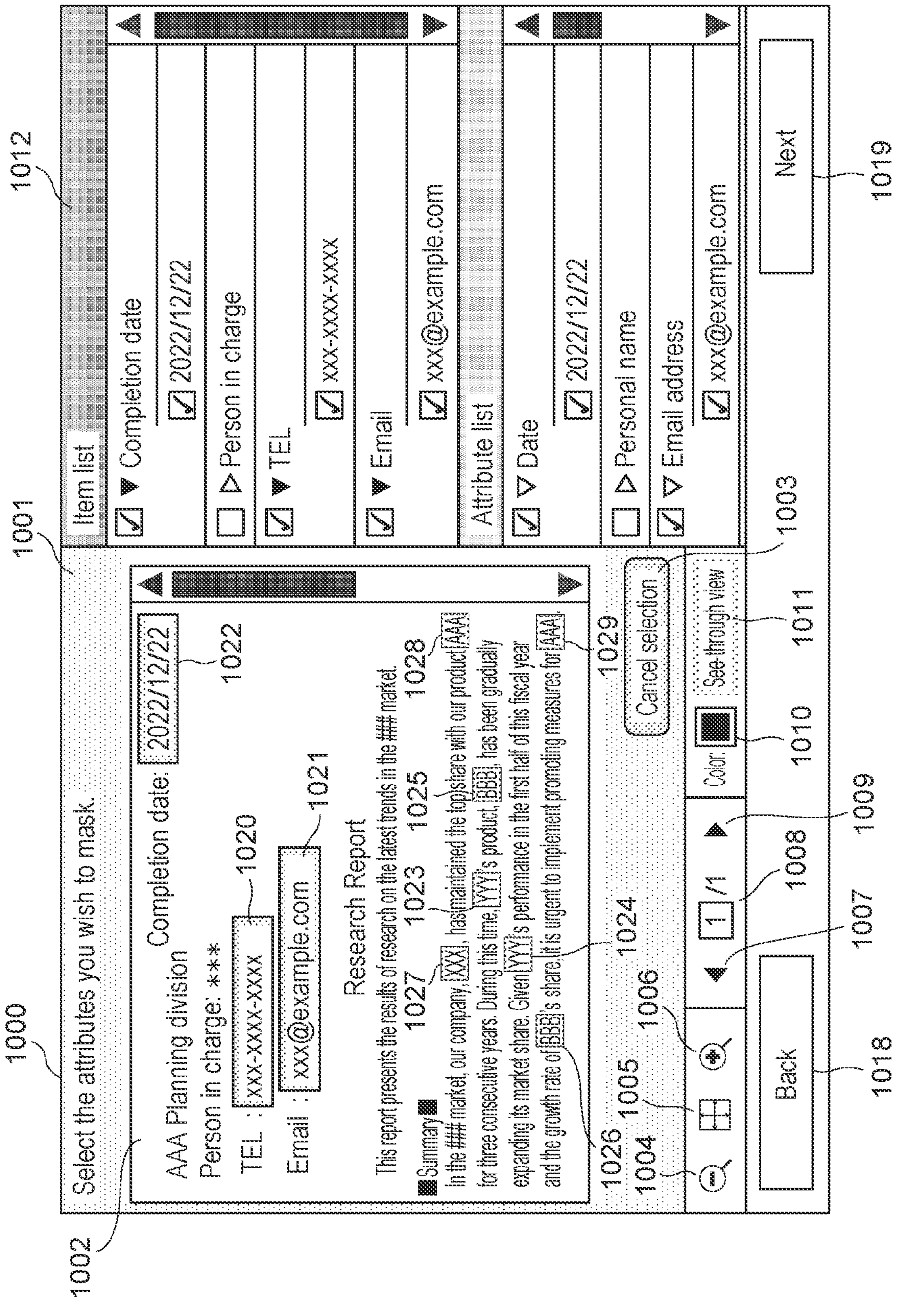
FIG. 11 illustrates an example of the preview screen displayed by the MFP.

Reference numeral 1204 indicates a button for returning to the preview screen 1100 in FIG. 10A, 10B, or 11. Reference numeral 1205 indicates a button for executing printing, saving, and preset registration. When it is detected that the execute button 1205 is pressed, the display control unit 421 determines whether the preset registration option 1203 is selected in S510. When the preset registration option 1203 is ON, the decision in S510 is 'Yes', and the display control unit 421 displays a preset name setting screen 1500 in S511. The user can register any preset name through the preset name input area 1501 of the preset name setting screen 1500.

Figure 15:
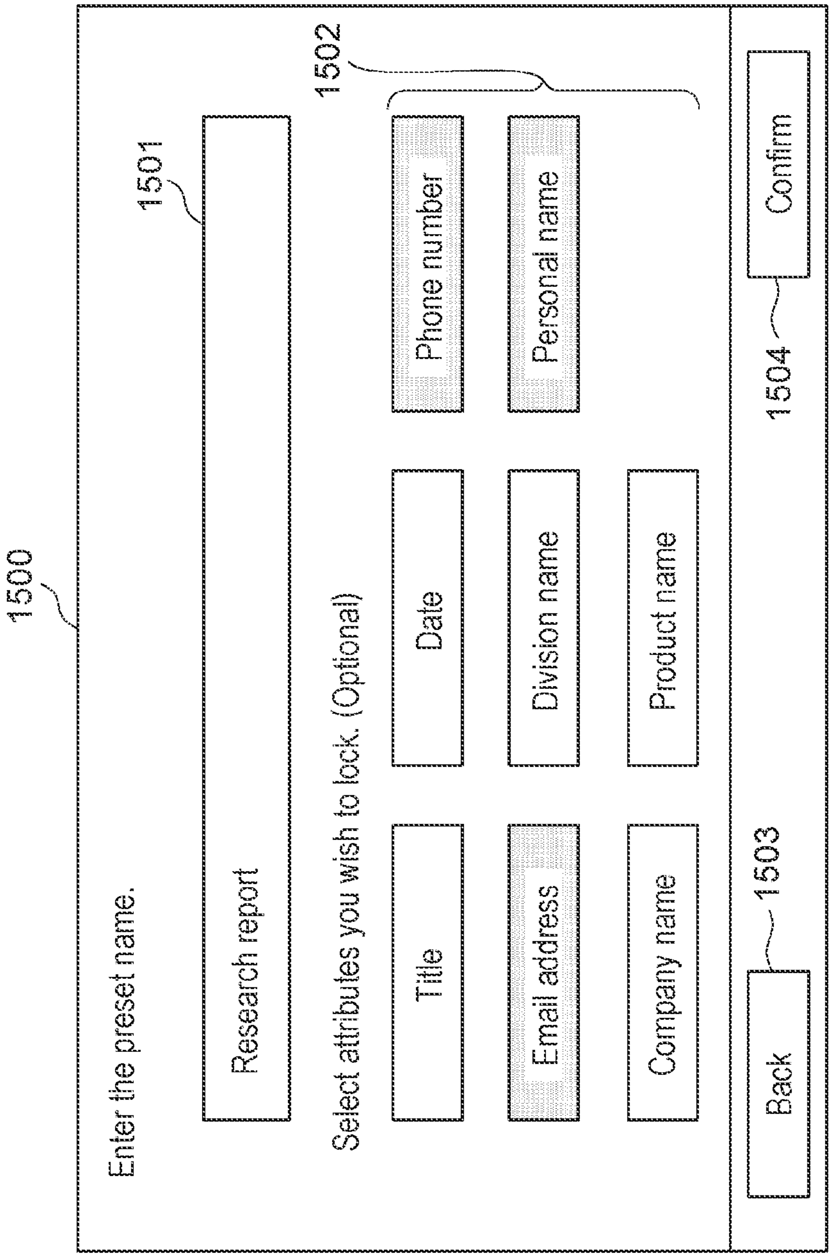
FIG. 15 illustrates an example of a preset name setting screen displayed by the MFP.

An attribute lock designation area 1502 allows configuration for designating specific attributes to prevent the specific attributes from being released from masking targets when information is retrieved as a preset. The attribute lock setting is not necessarily configured in the present embodiment. The attribute lock designation area 1502 illustrated in FIG. 15 is displayed based on the attribute list display area 1012 in FIG. 10B. In FIG. 15, three items of personal information, specifically phone number, email address, and personal name, are selected as locking targets, and company name and product name, which are not personal information, are excluded from the locking targets. The information specified in the attribute lock designation area 1502 is stored as an attribute lock 1415 of area information 1405 described later. When it is detected that the back button 1503 is pressed, the screen transitions to the execution confirmation screen 1200.

When it is detected that the confirm button 1504 is pressed, in S512, the data management unit 424 stores in the HDD 214 areas, setting information, and preset names that are configured this time with the MFP 110 in association with the corresponding button ID.

FIG. 14 provides an example of preset information 1400 stored by the data management unit 424. Reference numeral 1401 indicates a preset button ID. Reference numeral 1402 indicates a preset name inputted by the user in S511. Reference numerals 1403 and 1404 indicate output methods and scan settings that are configured on the scanning screen 900 in FIG. 9. Reference numeral 1405 indicates area information that is configured on the preview screen 1000 in FIG. 10A. As can be seen from the area information 1405, attribute names 1414 used to designate masking areas are stored. When designating masking targets using attributes, the coordinate information does not necessarily need to be stored as preset information because the coordinate position of the OCR text strings as masking targets may change depending on the input scanned image. Similarly, both coordinate information and OCR text strings may be included in the area information 1405, although the OCR text strings that belong to the individual attributes are not included in 1405 due to the possibility that the OCR text strings may change depending on the scanned image. Information for designating or excluding particular OCR text strings may be included.

Reference numeral 1411 indicates IDs that uniquely indicates area information records, similarly to 1301. Reference numeral 1412 indicates types of elements used in designating areas, similarly to 1302. As well as 'attribute,' other types such as 'coordinate' and 'text' can be used. Reference numeral 1413 indicates RGB color values, similarly to 1305. Reference numeral 1414 indicates attribute names that are configured using the attribute list display area 1012.

Reference numeral 1415 indicates attribute lock settings for specifying whether the corresponding attribute stored in the preset can be released from masking targets. When YES is selected for a preset setting of a specific attribute, the attribute cannot be released from the masking targets identified by calling the preset. When NO is selected, the attribute can be released from the masking targets. Using the attribute lock setting 1514, the user can input the attributes to be locked in S517.

Reference numeral 1406 indicates save settings that are configured on the execution confirmation screen 1200 in FIG. 12. The save setting 1406 stores the name rules and folder path rules of the save location. Print setting 1407 indicates print settings that are configured on the execution confirmation screen 1200 in FIG. 12. As described above, by registering the previously configured areas and settings as a preset, the same settings can be easily reused in later times. The registered preset information can be called via the preset list screen 800 in FIG. 8 in S504.

When the save operation in S512 is completed, the print instruction unit 425 determines in S513 whether print settings are configured. When print settings are configured, the result in S513 is 'Yes.' In S514, the print instruction unit 425 instructs the print execution unit 413 to execute printing of the image with the mask applied, and the print execution unit 413 executes printing.

Next, in S515, the external storage accessing unit 427 determines whether save settings are configured. When save settings are configured, the result in S515 is 'Yes'. In S516, the external storage accessing unit 427 executes saving of the image with the mask applied. At this time, the data conversion unit 426 converts the mask-applied image into the file format designated on the scanning screen 900 in FIG. 9. The external storage accessing unit 427 subsequently transmits the file with the specified file name to the save location specified on the preview screen 1000 in FIG. 10. The transmitted file is then stored in the external storage 120.

When the save operation in S516, in other words, the transmission operation, is completed, all operations of the masking application are complete. In response, screen transitions are executed, such as returning to the main screen of the MFP 110 or to the mask setting method selection screen in FIG. 7 for subsequent scans.

As described above, by displaying the text strings corresponding to the attributes in the image data to be edited and receiving the user's designation of whether to select the displayed text strings as masking targets, convenience is improved.

Second Embodiment

In the present embodiment, a method to further improve the convenience of configuring masking areas will be described with reference to FIGS. 11 and 18. This method is implemented by changing the display order based on the attribute classification method types. Descriptions of operations identical to the operations in the first embodiment will not be repeated.

The attribute classification unit 428 classifies text strings extracted from the OCR results obtained by the image processing unit 423 into attributes by character recognition operation that enables semantic understanding of OCR text strings or character recognition processing such as key-value extraction. Attribute name characteristics vary between classification based on semantic understanding and attribute classification based on key-value extraction. In classification based on semantic understanding, attribute names are predefined. By contrast, in classification based on key-value extraction, attribute names correspond to actual text strings in the input image data. Using the text strings actually in the image data as attribute names simplifies identifying the text strings on the preview screen by matching the text strings with the corresponding attribute names.

In FIG. 11, the attribute names classified by key-value extraction are displayed at the top of the list. In the attribute list display area 1012 of the preview screen 1000 in FIG. 11, an area labeled 'detail list' is displayed, and the area displays the text strings that correspond to the keys and values, extracted from the content of the document displayed on the preview screen. In this example, four attribute names 'completion date,' 'person in charge,' 'TEL,' and 'email' are displayed as the portions corresponding to keys. These four key text strings are actually present on the preview screen. OCR text strings '2022/12/22,' '**,' 'xxx-xxxx-xxxx,' and 'xxx@example.com' are displayed in an associated manner as the portions corresponding to values. Since the OCR text string '' under the attribute name 'person in charge' is not selected as a masking target, the OCR text string '*' is not displayed.

FIG. 18 provides information that contains item names in addition to the information provided in FIG. 16, in which attribute names are associates with OCR text strings. Item names correspond to attribute names classified through key-value extraction. OCR text strings can be associated with both attribute names classified through semantic understanding and item names classified through key-value extraction. The OCR text strings that are assigned item names are displayed at the top of the list in the attribute list display area 1012.

As described above, by changing the display order based on the attribute classification method types, the convenience of configuring masking areas by attribute designation is further improved.

Third Embodiment

In the present embodiment, a method for notifying the user that there is a detection omission when the attribute classification unit 428 fails to obtain a text string corresponding to a designated attribute will be described with reference to FIG. 19.

In the following description of the present embodiment, descriptions of configurational features and procedures identical to the first embodiment will not be repeated, and only different features will be described.

By displaying the designated attribute and the text string corresponding to the attribute on the preview screen, masking can be performed without omission on the attributes that are designated but not displayed in the attribute list display area.

Figure 19:
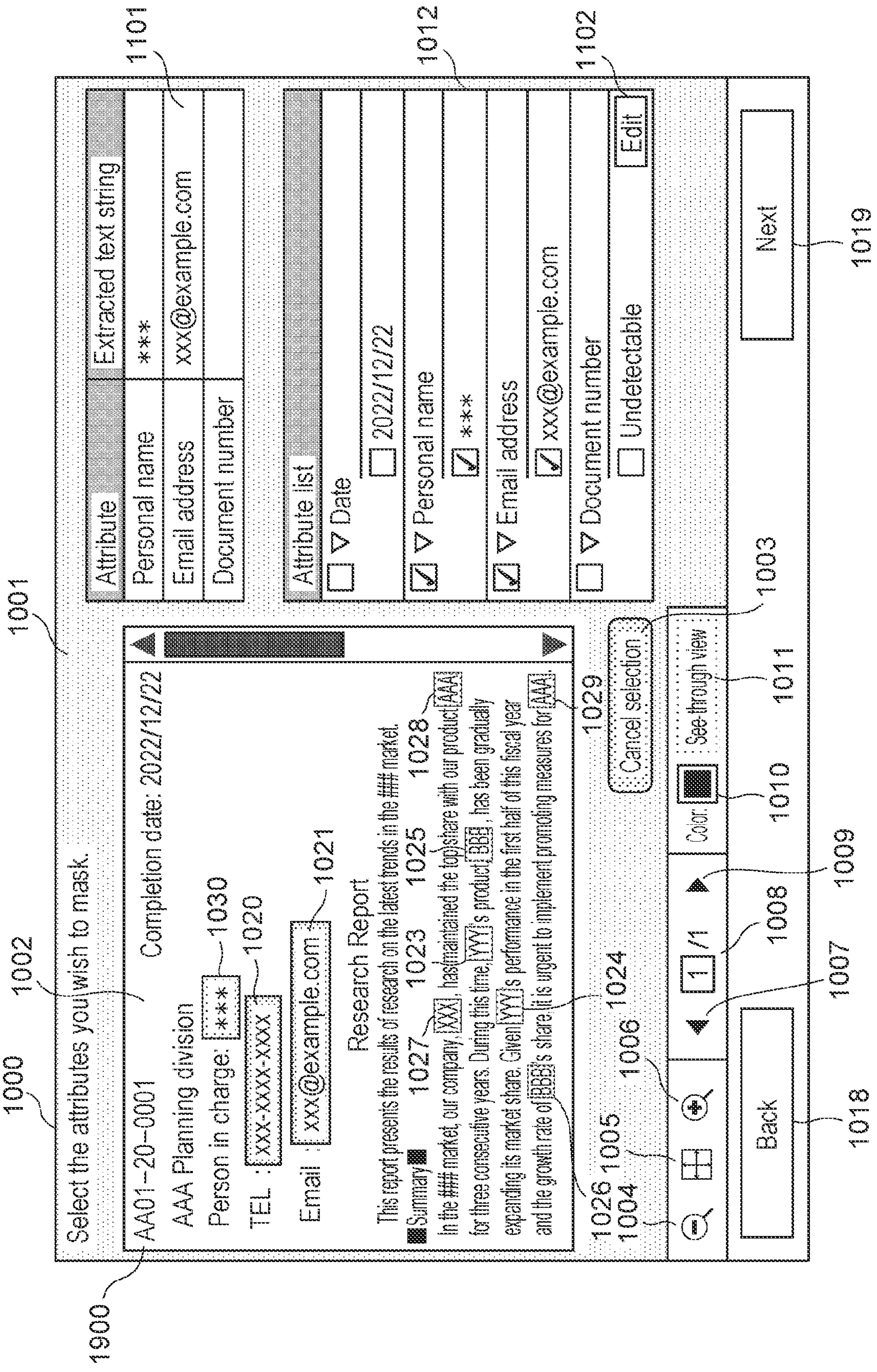
FIG. 19 illustrates an example of the preview screen displayed by the MFP.

FIG. 19 illustrates an example of the preview screen displayed by the display control unit 421 in S604 in the present embodiment. The preview screen 1000 includes a designated attribute display area 1101. The designated attribute display area 1101 is an area that lists text strings corresponding to designated attributes.

The designated attributes are included in the preset obtained by the display control unit 421 in S602 or selected on the attribute selection screen 1700 in S603. The text strings corresponding to the designated attributes are OCR text strings corresponding to the attribute names detected by the attribute classification unit 428.

The attribute names designated in S602 or S603 in the exemplary preview screen in FIG. 19 are 'personal name,' 'email address,' and 'document number.'

The display control unit 421 displays text strings corresponding to the designated attributes in the designated attribute display area 1101. Specifically, the text string '*' that corresponds to the attribute 'personal name,' the text string 'xxx@example.com' that corresponds to the attribute 'email address,' and the text string '"" (no text string)' that corresponds to the attribute 'document number' are displayed. The text string '"" (no text string)' indicates that no text string corresponding to a specific attribute cannot be obtained as a result of processing by the attribute classification unit 428**.

For example, when the attribute classification unit 428 uses a learning model based on training data to identify attributes corresponding to text strings obtained through OCR, it is assumed that no text string corresponding to the document number attribute may be detected due to the low accuracy of the learning model. When the attribute classification unit 428 classifies the text strings obtained through OCR under the attributes using the key-value extraction method, it is assumed that the image data may contain no key corresponding to the document number attribute. This case is illustrated in FIG. 19. A text string 1900 in the preview image 1002 is a document number that the user intends to mask. However, because no corresponding key is contained in the image data, the text string 1900 cannot be extracted through key-value extraction. When the attribute classification unit 428 classifies text strings under the attributes by detecting text strings using regular expressions that are preconfigured for the individual attributes, it is assumed that the configured regular expressions may be incorrect. Alternatively, it is also assumed that no text string corresponding to the document number attribute may be contained in the image data.

In S604, the display control unit 421 obtains from the RAM 213 the attribute names and OCR text strings identified by the attribute classification unit 428 and the attributes designated in S602 or S603.

The display control unit 421 subsequently creates a designated-attribute text-string correspondence list with attribute names used as keys, stores the designated-attribute text-string correspondence list in the RAM 213, and displays the designated-attribute text-string correspondence list at the operating unit 220.

TABLE 1

Designated-attribute text-string correspondence list

| Attribute name | OCR text string | Attribute designated? |
|---|---|---|
| Date | 2022 Dec. 22 | No |
| Personal name | *** | Yes |
| Title | Research report | No |
| Email address | xxx@example.com | Yes |
| Phone number | xxx-xxxx-xxxx | No |
| Company name | XXX | No |
| Company name | YYY | No |
| Product name | AAA | No |
| Product name | BBB | No |
| Document number | "" (no text string) | Yes |

The attribute names and OCR text strings correspond to the results obtained by the attribute classification unit 428. In the 'attribute designated?' field, 'Yes' indicates that the corresponding attribute is designated in S602 or S603; 'No' indicates that the corresponding attribute is not designated.

In the designated attribute display area 1101, the display control unit 421 displays all attribute names and OCR text strings that are assigned 'Yes' in the 'attribute designated?' field. When no text string is obtained, and '"" (no text string)' is assigned in the "OCR text string" field, a blank is displayed.

The attributes and OCR text strings that are assigned 'Yes' in the 'attribute designated?' field are displayed in the attribute list display area 1012 in the state in which the attributes and OCR text strings are selected as masking targets.

When a specific attribute is assigned 'Yes' in the 'attribute designated?' field, but no OCR text string for the attribute is obtained, a text string for alerting the user is displayed at the portion for text string display in the attribute list display area. For example, no OCR text string is obtained for the 'document number' attribute, and as a result, 'undetectable' is displayed.

An edit button 1102 can be used to designate masking areas that correspond to undetected text strings. When the display control unit 421 detects that the edit button 1102 is pressed, the display control unit 421 accepts masking area designation using a method such as text string designation or coordinate designation described in the first embodiment. Specifically, when it is detected that the edit button 1102 is pressed, and a touch operation by the user on the preview image 1002 is detected, the display control unit 421 accordingly identifies the coordinates of the area to be masked based on the location designated by the operation. For example, the coordinates of a character area corresponding to the location touched by the user, detected in the image subjected to scanned image analysis by the image processing unit 423, are identified as the coordinates of the character area to be masked. Alternatively, the coordinates corresponding to the start and end points of the user's drag operation are identified as the lower-right coordinates and the upper-left coordinates of the area to be masked. Alternatively, when it is detected that the edit button 1102 is pressed, the display control unit 421 displays an input field and a soft keyboard for text string input. The text string inputted in the input field is searched for in the image data, and the coordinates corresponding to the text string discovered by the searching are identified as the coordinates of the area to be masked. In some embodiments, attributes are designated using regular expressions configured as presets. In these cases, a screen for editing the regular expressions configured as presets may be displayed. When the user edits a regular expression for the document number attribute on this screen and then performs an operation for returning to the screen 1000, the display control unit 421, in cooperation with the attribute classification unit 428, identifies the text string corresponding to the document number attribute using the edited regular expression. The identified text string is then masked, and the screen 1000 is displayed.

The edit button 1102 is displayed with the text string for alerting the user at the OCR text string display portion within the attribute list display area 1012, when the corresponding attribute is assigned 'Yes' in the 'attribute designated?' field of the designated-attribute text-string correspondence list, but no corresponding OCR text string is present. The edit button may also be displayed for all OCR text strings.

When a corresponding text string is edited using the edit button 1102, the display control unit 421 creates the edited designated-attribute text-string correspondence list, adds 'AA01-20-0001' (not illustrated) to the edited OCR text string, and stores the designated-attribute text-string correspondence list in the RAM 213.

After editing, the designated-attribute text-string correspondence list includes the edited OCR text string as an additional item. In the present embodiment, the edited OCR text string is text. However, but the edited OCR text string may include other information such as area.

When an OCR text string is edited, the edited OCR text string is displayed in the attribute list display area 1102. When the OCR text string remains unedited, the original OCR text string is displayed in the attribute list display area 1102.

After a text string corresponding to the 'document number' attribute is set using the edit button 1102, the edited OCR text string remains after the edited OCR text string is deselected from masking targets. As a result, when the text string is repeatedly selected or deselected as a masking target, it is not necessary to re-designate masking targets using the edit button.

Since the designated attribute display area 1101 is based on the designated-attribute text-string correspondence list, the designated attribute display area 1101 can clearly indicate when no OCR text string is detected.

TABLE 2

Edited designated-attribute text-string correspondence list

| Attribute name | OCR text string | Edited OCR text string | Attribute designated? |
|---|---|---|---|
| Date | 2022 Dec. 22 | — | No |
| Personal name | *** | — | Yes |
| Title | Research report | — | No |
| Email address | xxx@example.com | — | Yes |
| Phone number | xxx-xxxx-xxxx | — | No |
| Company name | XXX | — | No |
| Company name | YYY | — | No |
| Product name | AAA | — | No |
| Product name | BBB | — | No |
| Document number | "" (no text string) | AA01-20-0001 | Yes |

When the user selects the edit button 1102 and edits the regular expression corresponding to a specific attribute or sets the coordinates of the area corresponding to the attribute, a checkbox for receiving a user's selection of whether to update the preset based on the edited information may be displayed. The display control unit 421 records whether the option for updating the preset is selected via the checkbox. When it is recorded that the option for updating the preset is selected via the checkbox in S510, the process proceeds to S511, and the updated preset is registered in S512. With this configuration, when there is a problem with recognizing text strings corresponding to the attributes, the settings for recognition can be adjusted and applied to the preset.

By implementing the present disclosure with the procedure described above, the attributes designated and the results obtained by the attribute classification unit 428 can be displayed in the designated attribute display area 1101. As a result, the text strings to be masked for the designated attributes can be visually checked. Further, it is also possible to visually check when no text string corresponding to a designated attribute is present. As such, masking can be performed without omissions.

Other Embodiments

The present disclosure can also be implemented by providing a program operable to implement one or more functions of the embodiments described above for a system or device via a network or storage medium and reading and running the program using one or more processors of a computer in the system or device. The present disclosure can also be implemented by a circuit (for example, an application-specific integrated circuit (ASIC) or field-programmable gate array (FPGA)) that implements one or more functions.

The information processing apparatus according to the present disclosure provides a screen that displays text strings corresponding to the attributes to be masked in the image data as an editing target. When no corresponding text string is obtained for a specific attribute, the screen indicates that no corresponding text string is obtained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-047678, filed Mar. 24, 2023 and No. 2023-198089, filed Nov. 22, 2023, which are hereby incorporated by reference herein in their entirety.

What is claimed is:

1. An image processing apparatus having a function of performing masking on data which contains text, the image processing apparatus comprising:

at least one memory which stores a computer program; and at least one processor which executes the computer program to perform a process which comprises:

receiving a selection of one or more attributes for text strings serving as masking targets for the masking; and displaying one or more text strings which are identified through analysis on the data and which correspond to the selected one or more attributes and also displaying a preview of the data in which the masking is performed on the one or more text strings contained in the data, wherein the preview is displayed in a first area, and the one or more text strings are displayed in a second area different from the first area together with information indicating that each of the one or more text strings is selected as a masking target, and wherein, in response to receiving in the second area a user operation for deselecting one text string among the one or more text strings as a masking target, in the first area, the preview is updated to another preview in which the masking on the one text string is released.

2. The image processing apparatus according to claim 1, wherein in the second area, a display of the second area is updated to display the one text string among the one or more text strings together with information indicating that the one text string is unselected as a masking target.

3. The image processing apparatus according to claim 2, wherein, after updating the preview and the display of the second area, in response to receiving an instruction to perform the masking, the masking is performed on the data while targeting, as masking targets, text strings displayed with information indicating that the text strings are selected as masking targets in the updated second area.

4. The image processing apparatus according to claim 1, wherein a selection of a plurality of attributes for text strings as masking targets is received, wherein a plurality of text strings corresponding to the plurality of attributes are identified through the analysis, and wherein the plurality of text strings are separately displayed in the second area in a manner that classifies the plurality of text strings under the plurality of attributes.

5. The image processing apparatus according to claim 3, wherein a display item for collectively deselecting one or more text strings corresponding to one attribute among the plurality of attributes as masking targets is additionally displayed in the second area, and wherein, in response to receiving a user operation on the display item, in the first area, the preview is updated to said another preview in which the masking on the one or more text strings corresponding to the one attribute is released, and in the second area, the display of the second area is updated to display the one or more text strings corresponding to the one attribute together with information indicating that the one or more text strings corresponding to the one attribute are unselected as masking targets.

6. The image processing apparatus according to claim 3, wherein, when one or more text strings corresponding to a specific attribute among the selected one or more attributes are not identified through the analysis, an indication that no text strings for the specific attribute are identified is displayed in the second area.

7. The image processing apparatus according to claim 1, further comprising a scanner, wherein the data corresponds to image data obtained by scanning with the scanner.

8. The image processing apparatus according to claim 1, wherein the preview is provided to display a text string as a masking target in a manner that renders an image applied onto the text string see-through.

9. The image processing apparatus according to claim 1, wherein the one or more attributes of text strings as masking targets are managed in association with one item, and wherein, in response to a selection of the one item, a selection of the one or more attributes is received.

10. A control method for an image processing apparatus having a function of performing masking on data which contains text, the control method comprising:

receiving a selection of one or more attributes for text strings serving as masking targets for the masking; and displaying one or more text strings which are identified through analysis on the data and which correspond to the selected one or more attributes and also displaying a preview of the data in which the masking is performed on the one or more text strings contained in the data, wherein the preview is displayed in a first area, and the one or more text strings are displayed in a second area different from the first area together with information indicating that each of the one or more text strings is selected as a masking target, and wherein, in response to receiving in the second area a user operation for deselecting one text string among the one or more text strings as a masking target, in the first area, the preview is updated to another preview in which the masking on the one text string is released.

11. A non-transitory storage medium storing a computer program that performs a control method for an image processing apparatus having a function of performing masking on data which contains text, the control method comprising:

receiving a selection of one or more attributes for text strings serving as masking targets for the masking; and displaying one or more text strings which are identified through analysis on the data and which correspond to the selected one or more attributes and also displaying a preview of the data in which the masking is performed on the one or more text strings contained in the data, wherein the preview is displayed in a first area, and the one or more text strings are displayed in a second area different from the first area together with information indicating that each of the one or more text strings is selected as a masking target, and wherein, in response to receiving in the second area a user operation for deselecting one text string among the one or more text strings from a masking target, in the first area, the preview is updated to another preview in which the masking on the one text string is released.

* * * * *